United States Patent
Zhou et al.

(10) Patent No.: US 12,543,116 B2
(45) Date of Patent: Feb. 3, 2026

(54) ELECTRONIC DEVICE, WIRELESS COMMUNICATION METHOD, AND COMPUTER-READABLE STORAGE MEDIUM

(71) Applicant: Sony Group Corporation, Tokyo (JP)

(72) Inventors: Mingtuo Zhou, Shanghai (CN); Min Liu, Beijing (CN)

(73) Assignee: Sony Group Corporation, Tokyo (JP)

( * ) Notice: Subject to any disclaimer, the term of this patent is extended or adjusted under 35 U.S.C. 154(b) by 348 days.

(21) Appl. No.: 18/251,883

(22) PCT Filed: Dec. 6, 2021

(86) PCT No.: PCT/CN2021/135670
§ 371 (c)(1),
(2) Date: May 5, 2023

(87) PCT Pub. No.: WO2022/121833
PCT Pub. Date: Jun. 16, 2022

(65) Prior Publication Data
US 2024/0015659 A1    Jan. 11, 2024

(30) Foreign Application Priority Data
Dec. 11, 2020 (CN) .......................... 202011450032.3

(51) Int. Cl.
*H04W 52/02* (2009.01)
*H04B 7/185* (2006.01)

(52) U.S. Cl.
CPC .... *H04W 52/0248* (2013.01); *H04B 7/18513* (2013.01); *H04B 7/18519* (2013.01)

(58) Field of Classification Search
CPC ........... H04W 52/0248; H04B 7/18513; H04B 7/18519
See application file for complete search history.

(56) References Cited

U.S. PATENT DOCUMENTS

| 2016/0041252 | A1* | 2/2016 | Cintron-Aponte | G01S 19/13 |
| | | | | 342/385 |
| 2020/0100080 | A1* | 3/2020 | Mladin | H04W 4/70 |
| 2021/0153063 | A1* | 5/2021 | Zhang | H04W 88/04 |

FOREIGN PATENT DOCUMENTS

| CN | 102474821 A | 5/2012 |
| CN | 105519011 A | 4/2016 |

(Continued)

OTHER PUBLICATIONS

International Search Report and Written Opinion mailed on Feb. 23, 2022, received for PCT Application PCT/CN2021/135670, filed on Dec. 6, 2021, 10 pages including English Translation.

(Continued)

*Primary Examiner* — Samina F Choudhry
(74) *Attorney, Agent, or Firm* — XSENSUS LLP

(57) ABSTRACT

An electronic device, a wireless communication method, and a computer-readable storage medium. The electronic device comprises a processing circuit, which is configured to: according to a sleep parameter and a start time of the next wake-up state of a relay user equipment (UE), determine a sleep parameter and a start time of the next wake-up state of a remote UE, so that when the remote UE is in a wake-up state, the relay UE is also in a wake-up state; and send the sleep parameter and the start time of the next wake-up state of the remote UE to the remote UE, the remote UE communicating with a satellite device by means of the relay UE. The wireless communication method enables a relay UE to provide services for a remote UE while saving, in a NTN network, the energy of the relay UE and the remote UE.

13 Claims, 16 Drawing Sheets

(56) References Cited

FOREIGN PATENT DOCUMENTS

| | | |
|---|---|---|
| CN | 106341877 A | 1/2017 |
| CN | 108700669 A | 10/2018 |
| CN | 110249706 A | 9/2019 |
| CN | 110720238 A | 1/2020 |
| CN | 111937450 A | 11/2020 |
| IN | 110546994 A | 12/2019 |
| WO | WO-2018170911 A1 * | 9/2018 ............ H04W 76/30 |

OTHER PUBLICATIONS

Sequans Communications, "Sidelink maintenance for evolved L2 relay", 3GPP TSG-RAN WG2#98, R2-1705126, May 15-19, 2017, 4 pages.

Song et al., "Fast Predicting Algorithm for Time Windows of Satellited to Ground Target", Modern Defence Technology, vol. 43, No. 1, Feb. 2015, pp. 87-93 (7 pages including English Abstract).

* cited by examiner

ELECTRONIC DEVICE, WIRELESS COMMUNICATION METHOD, AND COMPUTER-READABLE STORAGE MEDIUM

CROSS-REFERENCE TO RELATED APPLICATIONS

This application is based on PCT filing PCT/CN2021/135670, filed Dec. 6, 2021, which claims priority to Chinese Patent Application No. 202011450032.3, titled "ELECTRONIC DEVICE, WIRELESS COMMUNICATION METHOD, AND COMPUTER-READABLE STORAGE MEDIUM", filed on Dec. 11, 2020, with the China National Intellectual Property Administration, each of which is incorporated herein by reference in its entirety.

FIELD

Embodiments of the present disclosure generally relate to the field of wireless communication, and in particular to electronic equipment, a wireless communication method, and a computer-readable storage medium. More particularly, the present disclosure relates to electronic equipment serving as network side equipment in a wireless communication system, electronic equipment serving as relay user equipment in a wireless communication system, electronic equipment serving as remote user equipment in a wireless communication system, a wireless communication method performed by network side equipment in a wireless communication system, a wireless communication method performed by relay user equipment in a wireless communication system, a wireless communication method performed by remote user equipment in a wireless communication system, and a computer-readable storage medium.

BACKGROUND

An NTN (Non terrestrial Network) has a characteristic of wide coverage. A satellite can cover a huge area of the ground. Compared with a TN (Terrestrial Network), the NTN has an advantage of easy network deployment, so it can provide services for tens of thousands of UE (User Equipment). In the NTN, satellite equipment can service the user equipment. For example, a serving base station may be disposed on non-transparent satellite equipment, so that the serving base station can service the user equipment. For another example, a ground based serving base station can service the user equipment through be means of forwarding by transparent satellite equipment. For some user equipment with poor communication conditions (for example, the user equipment is located in a sheltered environment) or user equipment with low energy, it may be difficult to communicate with the satellite equipment. In this case, the user equipment with poor communication conditions or user equipment with low energy (referred to as remote user equipment) may communicate with the satellite equipment indirectly through relay user equipment.

In addition, the user equipment may have a sleep mode in which the user equipment is in a sleep state periodically, so as to save energy of the user equipment. As both the relay user equipment and the remote user equipment can be in the sleep mode, a design of communication in the NTN network is challenging.

Therefore, it is necessary to propose a technical solution to solve various problems caused by sleep modes of relay user equipment and remote user equipment in the NTN network, in order to enable the relay user equipment and the remote user equipment to work normally while saving energy of the relay user equipment and the remote user equipment.

SUMMARY

This section provides a general summary of the present disclosure, rather than a comprehensive disclosure of a full scope or all features of the present disclosure.

An objective of the present disclosure is to provide electronic equipment, a wireless communication method, and a computer-readable storage medium, in order to enable the relay user equipment and the remote user equipment in an NTN network to work normally while saving energy of the relay user equipment and the remote user equipment.

According to an aspect of the present disclosure, electronic equipment is provided. The electronic equipment includes processing circuitry configured to: determine sleep parameters and a start time of a next wakeup state of remote user equipment according to sleep parameters and a start time of a next wakeup state of relay user equipment, so that when the remote user equipment is in a wakeup state, the relay user equipment is also in a wakeup state; and send the sleep parameters and the start time of the next wakeup state of the remote user equipment to the remote user equipment, where the remote user equipment communicates with satellite equipment via the relay user equipment, and the sleep parameters include a duration of a sleep state and a duration of a wakeup state.

According to another aspect of the present disclosure, electronic equipment is provided. The electronic equipment includes processing circuitry configured to: receive sleep parameters and a start time of a next wakeup state of the electronic equipment, where the sleep parameters include a duration of a sleep state and a duration of a wakeup state, the sleep parameters are determined according to sleep parameters of relay user equipment, and the relay user equipment is in a wakeup state when the electronic equipment is in a wakeup state; and enter the sleep state and the wakeup state periodically according to the sleep parameters and the start time of the next wakeup state, where the electronic equipment communicates with satellite equipment via the relay user equipment.

According to another aspect of the present disclosure, a wireless communication method performed by electronic equipment is provided. The method includes: determining sleep parameters and a start time of a next wakeup state of remote user equipment according to sleep parameters and a start time of a next wakeup state of relay user equipment, so that when the remote user equipment is in a wakeup state, the relay user equipment is also in a wakeup state; and sending the sleep parameters and the start time of the next wakeup state of the remote user equipment to the remote user equipment, where the remote user equipment communicates with satellite equipment via the relay user equipment, and the sleep parameters include a duration of a sleep state and a duration of a wakeup state.

According to another aspect of the present disclosure, a wireless communication method performed by electronic equipment is provided. The method includes: receiving sleep parameters and a start time of a next wakeup state of the electronic equipment, where the sleep parameters include a duration of a sleep state and a duration of a wakeup state, the sleep parameters are determined according to sleep parameters of relay user equipment, and the relay user equipment is in a wakeup state when the electronic equipment is in a wakeup state; and entering the sleep state and the wakeup state periodically according to the sleep parameters and the start time of the next wakeup state, where the electronic equipment communicates with satellite equipment via the relay user equipment According to another aspect of the present disclosure, a computer-readable storage medium is provided. The computer-readable storage medium stores executable computer instructions. The executable computer instructions, when executed by a computer, causes the computer to perform the wireless communication method according to the present disclosure.

According to another aspect of the present disclosure, a computer program is provided. The computer program, when executed by a computer, causes the computer to perform the wireless communication method according to the present disclosure.

With the electronic equipment, the wireless communication methods, and the computer-readable storage medium according to the present disclosure, electronic equipment or relay user equipment in a core network can determine sleep parameters and a start time of a next wakeup state of remote user equipment according to sleep parameters and a start time of a next wakeup state of the relay user equipment, so that when the remote user equipment is in a wakeup state, the relay user equipment is also in a wakeup state. In this way, there is the relay user equipment that can service the remote user equipment when the remote user equipment wakes up. Thereby, the relay user equipment and the remote user equipment can be in the sleep mode and thereby save energy, and the remote user equipment can also be serviced by the relay user equipment.

Further areas of applicability will become apparent from the description provided herein. The description and specific examples in this summary are for purposes of illustration only and are not intended to limit the scope of the present disclosure.

BRIEF DESCRIPTION OF THE DRAWINGS

The drawings are described herein for illustrating selected embodiments, rather than all possible embodiments, and are not intended to limit the scope of the present disclosure. In the drawings.

Figure 1:
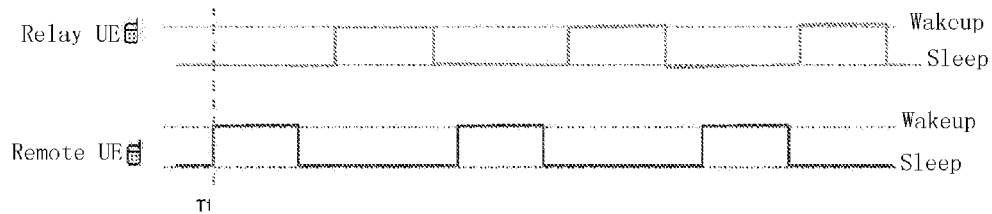
FIG. 1 is a schematic diagram showing a mismatch between sleep parameters of a relay UE and sleep parameters of a remote UE according to an embodiment of the present disclosure.

Although the present disclosure is susceptible to various modifications and alternatives, specific embodiments of the present disclosure are shown in the drawings by way of examples and are described in detail herein. However, it should be understood that description of the specific embodiments herein is not intended to limit the present disclosure to the specific forms disclosed, but to cover all modifications, equivalents and substitutions that fall within the spirit and scope of the present disclosure. It should be noted that same or similar reference numerals throughout the drawings indicate the same or like components.

DETAILED DESCRIPTION

The embodiments of the present disclosure are described completely with reference to the drawings. The following description is merely exemplary, and is not intended to limit the present disclosure and application or use thereof.

Exemplary embodiments are provided so that the present disclosure is thorough and fully conveys the scope thereof to those skilled in the art. Numerous specific details, such as examples of specific components, devices, and methods, are set forth to provide a comprehensive understanding of the embodiments of the present disclosure. It is apparent for those skilled in the art that the exemplary embodiments may be implemented in many different forms without specific details, and should not be construed as limiting the scope of the present disclosure. In some exemplary embodiments, well-known processes, well-known structures, and well-known technologies are not described in detail.

The description is made in the following order:
1. Problem description;
2. Determination of sleep parameters and a start time of a next wakeup state;
2.1 Configuration examples of electronic equipment in a core network;
2.2 Configuration examples of electronic equipment for a relay UE;
2.3 Configuration example of electronic equipment for a remote UE;
3. Description of a switching process;
3.1 Configuration examples of electronic equipment for a relay UE;
3.2 Configuration examples of electronic equipment for a remote UE;
3.3 Configuration examples of electronic equipment in a core network;
4. Method embodiment;
5. Application examples.

1. Problem Description

This disclosure aims at a scenario where an NTN network involves a relay service and a sleep mode. That is, the NTN network includes one or more relay user equipment and one or more remote user equipment. Each relay user equipment can provide a relay service for at least one remote user equipment. Moreover, both the relay user equipment and the remote user equipment can be in the sleep mode, that is, the relay user equipment and the remote user equipment can enter a sleep state and a wakeup state periodically. A problem to be solved by the present disclosure is described below in combination with FIG. 1 to FIG. 4.

FIG. 1 is a schematic diagram showing a mismatch between sleep parameters of a relay UE and sleep parameters of a remote UE according to an embodiment of the present disclosure. In FIG. 1, a horizontal axis represents time, an upper graph shows a curve of a sleep parameter of a relay UE, and a lower graph shows a curve of a sleep parameters of a remote UE. In each curve graph, an upper line indicates that the UE is awake, and a lower line indicates that the UE is asleep. As shown in FIG. 1, at time instant T1, the remote UE is in a wakeup state and the relay UE is in a sleep state. That is, in a case that the remote UE needs to send uplink data or receive downlink data at time instant T1, the remote UE is unable to send and receive data since the relay UE is in the sleep state.

Figure 2:
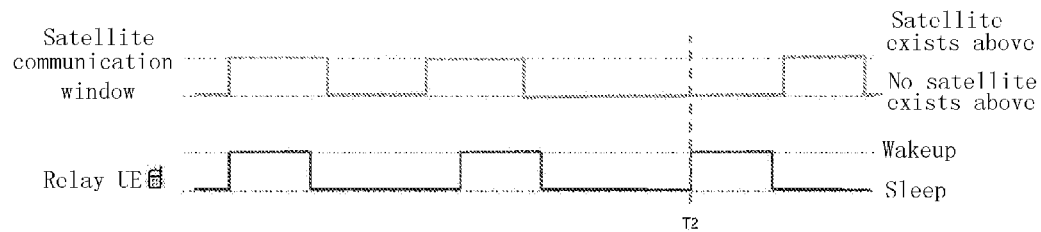
FIG. 2 is a schematic diagram showing a mismatch between a relay UE and a satellite communication window according to an embodiment of the present disclosure.

FIG. 2 is a schematic diagram showing a mismatch between a relay UE and a satellite communication window according to an embodiment of the present disclosure. In FIG. 2, a horizontal axis represents time, an upper graph shows a curve of a satellite communication window, and a lower graph shows a curve of a sleep parameter of a relay UE. In the curve graph of the satellite communication window, an upper line indicates that there is satellite equipment above the relay UE, and a lower line indicates that there is no satellite equipment above the relay UE. In the curve graph of a sleep parameter of the relay UE, an upper line indicates that the relay UE is in a wakeup state, and a lower line indicates that the relay UE is in a sleep state. As shown in FIG. 2, at time instant T2, the relay UE is in the wakeup state, but there is no satellite equipment above the relay UE. That is, in a case that the relay UE needs to send uplink data or receive downlink data at time instant T2, the relay UE is unable to send and receive data since there is no satellite equipment above the relay UE.

Figure 3:
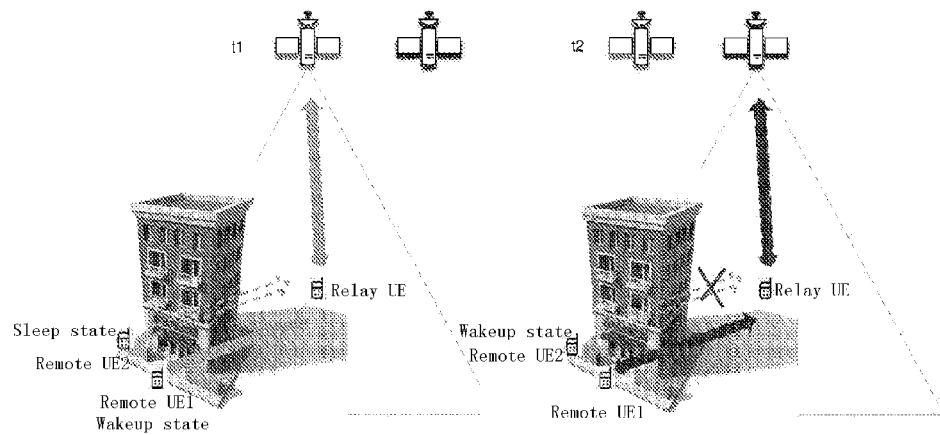
FIG. 3 is a schematic diagram showing a situation of a failed handover of a remote UE in a sleep state according to an embodiment of the present disclosure.

FIG. 3 is a schematic diagram showing a situation of a failed handover of a remote UE in a sleep state according to an embodiment of the present disclosure. In FIG. 3, a remote UE1 and a remote UE2 each communicate with satellite equipment through a relay UE. As shown on the left side of FIG. 3, at time t1, the remote UE1 is in a wakeup state, and communicates with the satellite equipment through the relay UE; and the remote UE2 is in a sleep state. Service satellite equipment of the relay UE changes as movement of the satellite. The remote UE1, as in the wakeup state, can perform a handover process together with the relay UE, and thereby can communicate with new satellite equipment through the relay UE. However, the remote UE2 cannot perform the handover process as the remote UE2 is in the sleep state. As shown on the right side of FIG. 3, at time t2, the remote UE2 wakes up, but cannot communicate with the new satellite equipment through the relay UE because the remote UE2 does not perform the handover process.

Figure 4:
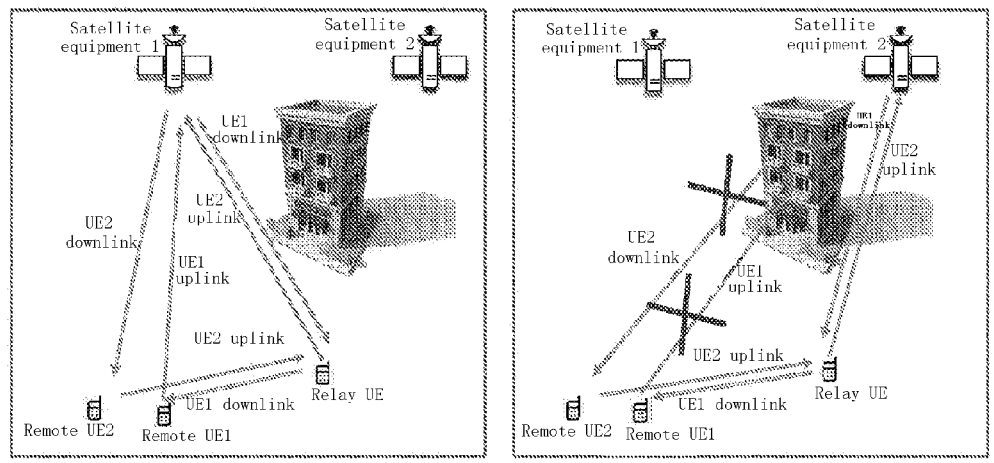
FIG. 4 is a schematic diagram showing a situation of failed communication for a remote UE with a hybrid connection after a relay UE switches a serving base station according to an embodiment of the present disclosure.

FIG. 4 is a schematic diagram showing a situation of failed communication for a remote UE with a hybrid connection after a relay UE switches a serving base station according to an embodiment of the present disclosure. In the present disclosure, a remote UE with a hybrid connection can perform one of uplink communication and downlink communication with a satellite equipment via a relay UE, and can perform the other one of the uplink communication and downlink communication directly with the satellite equipment. As shown on the left side of FIG. 4, the remote UE1 performs downlink communication with satellite equipment 1 via the relay UE, and performs uplink communication directly with the satellite equipment 1. The remote UE2 performs uplink communication with the satellite equipment 1 via the relay UE, and performs downlink communication directly with the satellite equipment 1. Each of the remote UE1 and the remote UE2 is a remote UE with hybrid connection.

During a process of the relay UE switching to a serving base station, the relay UE measures channel qualities of channels between the relay UE and other base stations, so that a source serving base station can select an appropriate target serving base station. In a process of selecting the target serving base station, the source serving base station considers only channel qualities between the relay UE and other base stations. That is, there is a possible situation that a channel quality of a channel between the remote UE and a target serving base station is poor. For the remote UE with hybrid connection, if the relay UE switches to a target serving base station, the remote UE may be unable to perform uplink communication or downlink communication in a case that the channel quality between the remote UE and the target serving base station is poor.

As shown on the right side of FIG. 4, after the relay UE performs switching measurement and switches to satellite equipment 2, because there is an obstruction between the remote UE2 and the satellite equipment 2, the remote UE2 can still perform uplink communication with the satellite equipment 2 via the relay UE, but cannot perform downlink communication directly with the satellite equipment 2. Similarly, since there is also an obstruction between the remote UE1 and the satellite equipment 2, the remote UE1 can still perform downlink communication with the satellite equipment 2 via the relay UE, but cannot perform uplink communication directly with the satellite equipment 2.

As mentioned above, FIG. 1 to FIG. 4 illustrate some problems in a scenario where the NTN network involves relay service and a sleep mode.

In order to solve at least one of the above problems, the present disclosure proposes electronic equipment in a wireless communication system, a wireless communication method performed by electronic equipment in a wireless communication system, and a computer-readable storage medium. Therefore, in an NTN network, relay user equipment can service remote user equipment, and energy of both the relay user equipment and the remote user equipment is saved.

The wireless communication system according to the present disclosure may be a NR (New Radio) communication system. In addition, the wireless communication system according to the present disclosure may include an NTN.

The electronic equipment for a network side according to the present disclosure may be located in a core network and can be implemented through various types of servers.

The base station equipment according to the present disclosure may be, for example, an eNB or gNB (a base station in the fifth-generation communication system). In the present disclosure, the base station equipment may be located on satellite equipment serving the user equipment, that is, the satellite equipment is a non-transparent satellite equipment having a capability of data processing. Alternatively, the base station equipment may be located on a ground station, that is, the satellite equipment serving the user equipment is transparent satellite equipment without the ability of data processing, so that data has to be forwarded to the ground station for processing.

The satellite equipment according to the present disclosure includes, but is not limited to, GEO (Geosynchronous Orbit) satellite equipment, LEO (Low Earth Orbit) satellite equipment, MEO (Medium Earth Orbit) satellite equipment, HEO (Highly Elliptical Orbiting) satellite equipment and HAPS (High Altitude Platform Station).

A structure of the remote user equipment may be consistent with a structure of the relay user equipment according to the present disclosure. That is, user equipment is referred to as relay user equipment when serving as relay equipment, and is referred to as remote user equipment when serving as remote equipment.

The user equipment may be a mobile terminal (such as a smart phone, a tablet personal computer (PC), a laptop PC, a portable game terminal, a portable/dongle mobile router, and a digital camera device) or a vehicle terminal (such as a car navigation device). The user equipment may also be implemented as a terminal (also called a machine type communication (MTC) terminal) that performs machine to machine (M2M) communication. In addition, the user equipment may be a wireless communication module (such as an integrated circuit module including a single chip) installed on each of the above terminals.

2. Determination of Sleep Parameters and a Start Time of a Next Wakeup State

<2.1 Configuration Example of Electronic Equipment in a Core Network>

Figure 5:
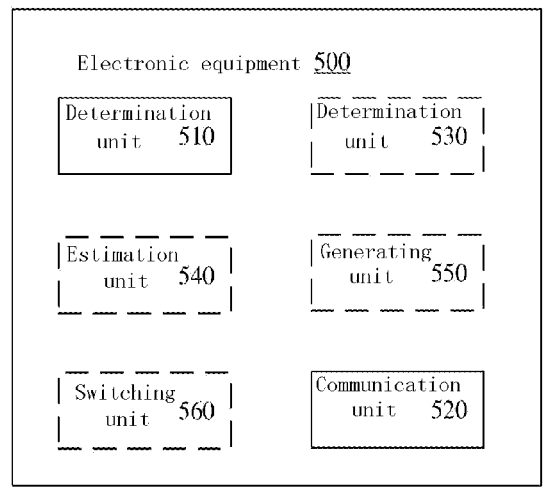
FIG. 5 is a block diagram showing an example of a configuration of electronic equipment on a network side according to an embodiment of the present disclosure.

FIG. 5 is a block diagram showing an example of a configuration of electronic equipment 500 according to an embodiment of the present disclosure. The electronic equipment 500 here may serve as network side equipment in a wireless communication system, and may specifically be located in a core network.

As shown in FIG. 5, the electronic equipment 500 may include a determination unit 510 and a communication unit 520.

Here, each unit of the electronic equipment 500 may be included in processing circuitry. It should be noted that the electronic equipment 500 may include a single processing circuit, or multiple processing circuits. Further, the processing circuitry may include various discrete functional units for performing different functions and/or operations. It should be noted that these functional units may be physical entities or logical entities, and units with different names may be implemented through a same physical entity.

According to an embodiment of the present disclosure, the determination unit 510 is configured to determine sleep parameters and a start time of a next wakeup state of remote user equipment according to the sleep parameters and a start time of a next wakeup state of relay user equipment, so that when the remote user equipment is in the wakeup state, the relay user equipment is also in a wakeup state.

Here, the relay user equipment refers to relay user equipment through which the remote user equipment communicates with satellite equipment. According to an embodiment of the present disclosure, the sleep parameters determined by the determination unit 510 may include a duration of a sleep state and a duration of a wakeup state of the remote user equipment.

According to an embodiment of the present disclosure, the electronic equipment 500 is configured to send, through the communication unit 520, the sleep parameters and the start time of the next wakeup state of the remote user equipment to the remote user equipment. Here, in a case that the satellite equipment performs downlink communication with the remote user equipment via the relay user equipment, the electronic equipment 500 can send the sleep parameters and the start time of the next wakeup state of the remote user equipment to the relay user equipment through the satellite equipment, so that the relay user equipment can forward this information to the remote user equipment. In a case that the satellite equipment performs downlink communication directly with the remote user equipment, the electronic equipment 500 can also send the sleep parameters and the start time of the next wakeup state of the remote user equipment directly to the remote user equipment through the satellite equipment.

As can be seen, the electronic equipment 500 according to the embodiment of the present disclosure can determine the sleep parameters and the start time of the next wakeup state of the remote user equipment according to the sleep parameters and the start time of the next wakeup state of the relay user equipment, so that when the remote user equipment is in the wakeup state, the relay user equipment is also in the wakeup state. In this way, when the remote user equipment wakes up, there exists relay user equipment serving the remote user equipment, so that both the relay user equipment and the remote user equipment can be in the sleep mode and thereby save energy, and the remote user equipment can also be serviced by the relay user equipment.

According to an embodiment of the present disclosure, the determination unit 510 may determine the sleep parameters and the start time of the next wakeup state of the remote user equipment in various manners, as long as it is ensured that the relay user equipment is in the wakeup state when the remote user equipment is in the wakeup state, which is not limited in the present disclosure.

For example, the determination unit 510 may select some time periods from all time periods of the wakeup state of the relay user equipment periodically as time periods of the wakeup state of the remote user equipment. That is, a duration of the wakeup state of the remote user equipment is equal to or less than a duration of the wakeup state of the relay user equipment, and a duration of the sleep state of the remote user equipment is equal to or greater than a duration of the sleep state of the relay user equipment. Further, the start time of the wakeup state of the remote user equipment may or may not be aligned with the start time of the wakeup state of the relay user equipment. In an example, the determination unit 510 may select a time period for the wakeup state of the remote user equipment in each time period of the wakeup state of the relay user equipment. In another example, the determination unit 510 may select a time period from each of the $1^{st}$, the $3^{rd}$, the $5^{th}$, . . . time periods for the wakeup states of the relay user equipment as time periods for the wakeup state of the remote user equipment.

According to an embodiment of the present disclosure, the electronic equipment 500 may further receive expected sleep parameters of the remote user equipment from the remote user equipment through the communication unit 520. In a case that the satellite equipment performs uplink communication with the remote user equipment via the relay user equipment, the remote user equipment may send the expected sleep parameters to the relay user equipment, so that the relay user equipment forwards the expected sleep parameters to the electronic equipment 500 via the satellite equipment. In a case that the satellite equipment performs uplink communication directly with the remote user equipment, the remote user equipment may send the expected sleep parameters directly to the satellite equipment and thus to the electronic equipment 500.

According to an embodiment of the present disclosure, the remote user equipment may send the expected sleep parameters to the electronic equipment 500 after the remote user equipment establishes a connection with the relay user equipment. Here, the remote user equipment can determine the expected sleep parameters according to data transmission characteristics, including but not limited to a data transmission cycle and a data length. The expected sleep parameters include an expected duration of the sleep state and an expected duration of the wakeup state of the remote user equipment.

In this way, the determination unit 510 may determine the sleep parameters of the remote user equipment according to the expected sleep parameters of the remote user equipment. That is, the determination unit 510 may satisfy the expected sleep parameters of the remote user equipment as much as possible under a condition that the relay user equipment is in the wakeup state when the remote user equipment is in the wakeup state.

According to an embodiment of the present disclosure, in a case that the relay user equipment services multiple remote user equipment, the determination unit 510 may determine the sleep parameters and the time of the next wakeup state of the remote user equipment according to sleep parameters and a time of the next wakeup state of another remote user equipment, so that data amounts forwarded by the relay user equipment are distributed evenly among time periods for the wakeup state.

According to an embodiment of the present disclosure, as shown in FIG. 5, the electronic equipment 500 may further include a determination unit 530. The determination unit 530 is configured to determine the start time of the next wakeup state of the relay user equipment and the sleep parameters of the relay user equipment, so that when the relay user equipment is in the wakeup state, there exists satellite equipment serving the relay user equipment. Further, the electronic equipment 500 may send the start time of the next wakeup state of the relay user equipment and the sleep parameters of the relay user equipment to the relay user equipment through the communication unit 520.

According to an embodiment of the present disclosure, the determination unit 530 may determine the start time of the next wakeup state of the relay user equipment and the sleep parameters of the relay user equipment according to ephemeris information of each satellite equipment. Specifically, the determination unit 530 may determine time instants when each satellite equipment is located above the relay user equipment according to the ephemeris information of each satellite equipment, so as to determine the start time of the next wakeup state of the relay user equipment and the sleep parameters of the relay user equipment, so that each time the relay user equipment is in the wakeup state, there exists satellite equipment above the relay user equipment and serving the relay user equipment. Here, the "above the relay user equipment" refers to a space area in which the satellite equipment can service the relay user equipment.

According to an embodiment of the present disclosure, the electronic equipment 500 may receive expected sleep parameters of the relay user equipment from the relay user equipment through the communication unit 520.

According to an embodiment of the present disclosure, the relay user equipment, after joining the network, may send the expected sleep parameters to the electronic equipment 500. Here, the relay user equipment may determine the expected sleep parameters according to data transmission characteristics, including but not limited to a data transmission cycle and a data length. The expected sleep parameters include an expected duration of the sleep state of the relay user equipment and an expected duration of the wakeup state of the relay user equipment.

In this way, the determination unit 530 may determine the sleep parameters of the relay user equipment according to the expected sleep parameters of the relay user equipment. That is, the determination unit 530 satisfies the expected sleep parameters of the relay user equipment as much as possible while ensuring that there exists satellite equipment serving the relay user equipment when the relay user equipment is in the wakeup state.

As described above, according to an embodiment of the present disclosure, the electronic equipment 500 may determine the start time of the next wakeup state and the sleep parameters of the relay user equipment, so that every time the relay user equipment wakes up, there exists satellite equipment serving the relay user equipment. Therefore, a situation where the relay user equipment cannot send and receive data is avoided.

According to the embodiments of the present disclosure, after the relay user equipment accesses the network and the electronic equipment 500 determines the sleep parameters and the start time of the next wakeup state of the relay user equipment, the sleep parameters and the start time of the next wakeup state of the relay user equipment can be dynamically adjusted. For example, the relay user equipment can determine the time of the next wakeup according to the determined sleep parameters, and then determine whether there exists satellite equipment that is above the relay user equipment and capable of serving the relay user equipment when the relay user equipment is in the next wakeup state. In a case that the satellite equipment capable of serving the relay user equipment does not exist, the relay user equipment may send the expected sleep parameters again, so that there exists the satellite equipment capable of serving the relay user equipment in the next wakeup state of the relay user equipment. The determination unit 530 may determine adjusted sleep parameters and determined start time of the next wakeup state of the relay user equipment according to the expected sleep parameters of the relay user equipment. Similarly, after the remote user equipment establishes a connection with the relay user equipment so that the electronic equipment 500 determines the sleep parameters and the start time of the next wakeup state of the remote user equipment, the sleep parameters and the start time of the next wakeup state of the remote user equipment can be dynamically adjusted. For example, the remote user equipment can determine the time of the next wakeup state according to the determined sleep parameters, and then determine whether the relay user equipment wakes up and whether there exists satellite equipment capable of serving the remote user equipment when the remote user equipment is in the next wakeup state. In a case that the satellite equipment capable of serving the remote user equipment does not exist or the relay user equipment is in the sleep state, the remote user equipment may send the expected sleep parameters again, so that when the remote user equipment is in the next wakeup state, there exists the satellite equipment that is above the remote user equipment and capable of serving the remote user equipment and the relay user equipment is in the wakeup state. The determination unit 520 may determine adjusted sleep parameters and adjusted start time of the next wakeup state of the remote user equipment according to the expected sleep parameters of the remote user equipment.

<2.2 Configuration Example of Electronic Equipment for a Relay UE>

Figure 6:
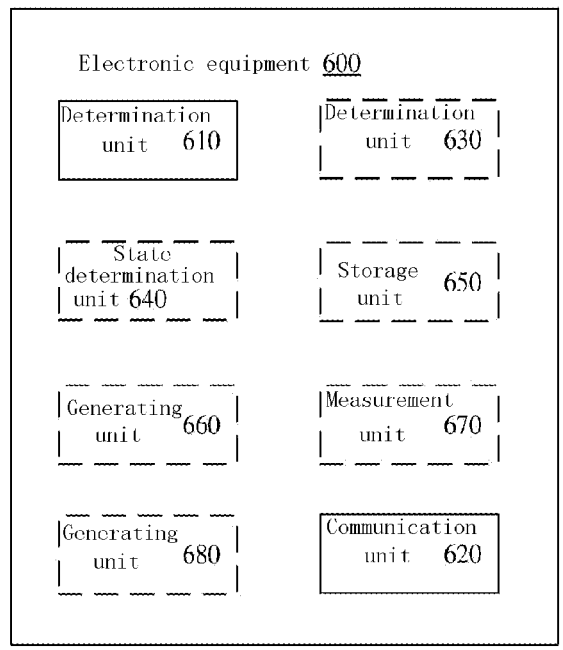
FIG. 6 is a block diagram showing an example of a configuration of electronic equipment for a relay UE according to an embodiment of the present disclosure.

FIG. 6 is a block diagram showing a structure of electronic equipment 600 serving as relay user equipment in a wireless communication system according to an embodiment of the present disclosure.

As shown in FIG. 6, the electronic equipment 600 may include a determination unit 610 and a communication unit 620.

Here, each unit of the electronic equipment 600 may be included in processing circuitry. It should be noted that the electronic equipment 600 may include a single processing circuit, or multiple processing circuits. Further, the processing circuitry may include various discrete functional units for performing different functions and/or operations. It should be noted that these functional units may be physical entities or logical entities, and units with different names may be implemented by a same physical entity.

According to an embodiment of the present disclosure, the determination unit 610 is configured to determine sleep parameters and a start time of a next wakeup state of remote user equipment according to sleep parameters and a start time of a next wakeup state of relay user equipment (that is, the electronic equipment 600), so that when the remote user equipment is in the wakeup state, the electronic equipment 600 is also in the wakeup state.

According to an embodiment of the present disclosure, the sleep parameters determined by the determination unit 610 may include a duration of a sleep state of the remote user equipment and a duration of a wakeup state of the remote user equipment.

According to an embodiment of the present disclosure, the electronic equipment 600 may send the sleep parameters and the start time of the next wakeup state of the remote user equipment to the remote user equipment through the communication unit 620.

As can be seen, the electronic equipment 600 according to the embodiment of the present disclosure can determine the sleep parameters and the start time of the next wakeup state of the remote user equipment according to the sleep parameters and the start time of the next wakeup state of the electronic equipment 600, so that when the remote user equipment is in the wakeup state, the electronic equipment 600 is also in the wakeup state. In this way, when the remote user equipment wakes up, there exists the electronic equipment 600 serving the remote user equipment, so that both the electronic equipment 600 and the remote user equipment can be in the sleep mode and thereby save energy, and the remote user equipment can also be serviced by the electronic equipment 600.

According to an embodiment of the present disclosure, the determination unit 610 may determine the sleep parameters and the start time of the next wakeup state of the remote user equipment in a manner similar to that described related to the determination unit 510, as long as it is ensured that the electronic equipment 600 is in the wakeup state when the remote user equipment is in the wakeup state, which is not limited in the present disclosure.

For example, the determination unit 610 may select some time periods from all time periods of the wakeup state of the electronic equipment 600 periodically as time periods of the wakeup state of the remote user equipment. That is, a duration of the wakeup state of the remote user equipment is equal to or less than a duration of the wakeup state of the electronic equipment 600, and a duration of the sleep state of the remote user equipment is equal to or greater than a duration of the sleep state of the electronic equipment 600. Further, the start time of the wakeup state of the remote user equipment may or may not be aligned with the start time of the wakeup state of the electronic equipment 600. In an example, the determination unit 610 may select a time period for the wakeup state of the remote user equipment in each time period of the wakeup state of the electronic equipment 600. In another example, the determination unit 610 may select a time period from each of the $1^{st}$, the $3^{rd}$, the time periods for the wakeup states of the electronic equipment 600 as time periods for the wakeup state of the remote user equipment.

According to an embodiment of the present disclosure, the electronic equipment 600 may further receive expected sleep parameters of the remote user equipment from the remote user equipment through the communication unit 620. According to an embodiment of the present disclosure, the remote user equipment may send the expected sleep parameters to the electronic equipment 600 after the remote user equipment establishes a connection with the electronic equipment 600. Here, the remote user equipment may determine the expected sleep parameters according to data transmission characteristics, including but not limited to a data transmission cycle and a data length. The expected sleep parameters include an expected duration of a sleep state of the remote user equipment and an expected duration of a wakeup state of the remote user equipment. In this way, the determination unit 610 can determine the sleep parameters of the remote user equipment according to the expected sleep parameters of the remote user equipment. That is, the determination unit 610 can satisfy the expected sleep parameters of the remote user equipment as much as possible under a condition that the electronic equipment 600 is in the wakeup state when the remote user equipment is in the wakeup state.

According to an embodiment of the present disclosure, in a case that the electronic equipment 600 serves multiple remote user equipment, the determination unit 610 may further determine the sleep parameters and the time of the next wakeup state of the remote user equipment according to sleep parameters and a time of a next wakeup state of another remote user equipment, so that data amounts forwarded by the electronic equipment 600 are distributed evenly among time periods for the wakeup state.

According to an embodiment of the present disclosure, as shown in FIG. 6, the electronic equipment 600 may further include a determination unit 630. The determination unit 630 is configured to determine the start time of the next wakeup state of the relay user equipment, so that when the electronic equipment 600 is in the wakeup state, there exists satellite equipment serving the electronic equipment 600.

According to an embodiment of the present disclosure, the electronic equipment 600 may receive the sleep parameters of the electronic equipment 600 from a core network through the communication unit 620, and determine the start time of the next wakeup state of the relay user equipment according to the sleep parameters of the electronic equipment 600 and ephemeris information of each satellite equipment. Specifically, the determination unit 630 can determine time instants when each satellite equipment is located above the electronic equipment 600 according to the ephemeris information of each satellite equipment, so as to determine the start time of the next wakeup state of the electronic equipment 600 in combination with the sleep parameters of the electronic equipment 600, so that each time the electronic equipment 600 is in the wakeup state, there exists satellite equipment above the electronic equipment 600 and serving the electronic equipment 600.

According to an embodiment of the present disclosure, the electronic equipment 600 may also send expected sleep parameters of the electronic equipment 600 to the core network through the communication unit 620. Here, the electronic equipment 600 may send the expected sleep parameters to the core network after joining the network. The electronic equipment 600 may determine the expected sleep parameters according to data transmission characteristics, including but not limited to a data transmission cycle and a data length. The expected sleep parameters include an expected duration of the sleep state of the electronic equipment 600 and an expected duration of the wakeup state for the electronic equipment 600.

As described above, according to the embodiments of the present disclosure, the electronic equipment 600 can determine the start time of the next wakeup state of the electronic equipment 600, so that every time the electronic equipment 600 wakes up, there exists satellite equipment serving the electronic equipment 600. Therefore, a situation where the electronic equipment 600 cannot send and receive data is avoided.

<2.3 Configuration Example of Electronic Equipment for a Remote UE>

Figure 7:
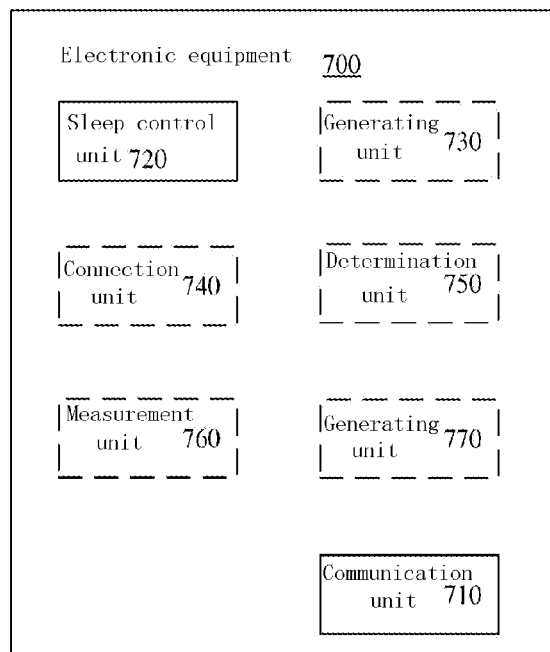
FIG. 7 is a block diagram showing an example of the configuration of an electronic equipment for a remote UE according to an embodiment of the present disclosure.

FIG. 7 is a block diagram showing a structure of electronic equipment 700 serving as remote user equipment in a wireless communication system according to an embodiment of the present disclosure. The electronic equipment 700 performs at least one of uplink communication and downlink communication with satellite equipment via relay user equipment.

As shown in FIG. 7, the electronic equipment 700 may include a communication unit 710 and a sleep control unit 720.

Here, each unit of the electronic equipment 700 may be included in processing circuitry. It should be noted that the electronic equipment 700 may include a single processing circuit, or multiple processing circuits. Further, the processing circuitry may include various discrete functional units for performing different functions and/or operations. It should be noted that these functional units may be physical entities or logical entities, and units with different names may be implemented by a same physical entity.

According to an embodiment of the present disclosure, the electronic equipment 700 can receive sleep parameters and a start time of a next wakeup state of the electronic equipment 700 through the communication unit 710. The sleep parameters include a duration of a sleep state and a duration of a wakeup state. The sleep parameters are determined according to the sleep parameters of relay user equipment. When the electronic equipment 700 is in the wakeup state, the relay user equipment is also in the wakeup state.

Here, the sleep parameters and the start time of the next wakeup state of the electronic equipment 700 may be determined by the relay user equipment. That is, the electronic equipment 700 receives this information from the relay user equipment. Alternatively, the sleep parameters and the start time of the next wakeup state of the electronic equipment 700 may be determined by a core network. That is, the electronic equipment 700 receives the information forwarded by the relay user equipment from the relay user equipment, or receives the information directly from the satellite equipment.

According to an embodiment of the present disclosure, the sleep control unit 720 may control the electronic equipment 700 to enter the sleep state and the wakeup state periodically according to the sleep parameters and the start time of the next wakeup state.

According to an embodiment of the present disclosure, the sleep control unit 720 may be configured to: control the electronic equipment 700 to enter the sleep state and wake up according to the start time of the next wakeup state; determine a duration of the next wakeup state according to the duration of the wakeup state in the sleep parameters, and thus determine the start time of the next sleep state; and determine a duration of a further next sleep state according to a duration of the sleep state in the sleep parameters. In this way, the sleep control unit 720 can control the electronic equipment 700 to enter the sleep state and the wakeup state periodically.

According to an embodiment of the present disclosure, as shown in FIG. 7, the electronic equipment 700 may further include a generating unit 730. The generating unit 730 is configured to generate expected sleep parameters of the electronic equipment 700. The expected sleep parameters include an expected duration of the sleep state of the electronic equipment 700 and an expected duration of the wakeup state of the electronic equipment 700.

Further, the electronic equipment 700 may send the expected sleep parameters to the relay user equipment through the communication unit 710, so that the relay user equipment can determine the sleep parameters and the time of the next wakeup state of the electronic equipment 700 according to the expected sleep parameters of the electronic equipment 700. Alternatively, the electronic equipment 700 may send the expected sleep parameters to the relay user equipment through the communication unit 710, and the relay user equipment forwards the expected sleep parameters of the electronic equipment 700 to the core network, so that the core network determines the sleep parameters and the time of the next wakeup state of the electronic equipment 700 according to the expected sleep parameters of the electronic equipment 700. According to an embodiment of the present disclosure, the electronic equipment 700 may send the expected sleep parameters to the relay user equipment after the electronic equipment 700 establishes a connection with the relay user equipment. Here, the electronic equipment 700 may determine the expected sleep parameters according to data transmission characteristics, including but not limited to a data transmission cycle and a data length.

As can be seen, for the electronic equipment 700 according to the embodiment of the present disclosure, the sleep parameters and the start time of the next wakeup state are determined according to the sleep parameters and the start time of the next wakeup state of the relay user equipment, so that the relay user equipment is in the wakeup state when the electronic equipment 700 wakes up. In this way, when the electronic equipment 700 wakes up, there exists the relay user equipment that services the electronic equipment 700. Therefore, both the electronic equipment 700 and the relay user equipment can be in the sleep mode and thereby save energy, and the electronic equipment 700 can be serviced by the relay user equipment.

Described above is determination of the sleep parameters and the start time of the next wakeup state of the relay user equipment and the remote user equipment according to the embodiment of the present disclosure. Signaling flows of the above determination are described below in combination with FIG. 8 to FIG. 11. In FIG. 8 to FIG. 11, CN (core network) may include the electronic equipment 500, a relay UE may be implemented by the electronic equipment 600, and a remote UE may be implemented by the electronic equipment 700.

Figure 8:
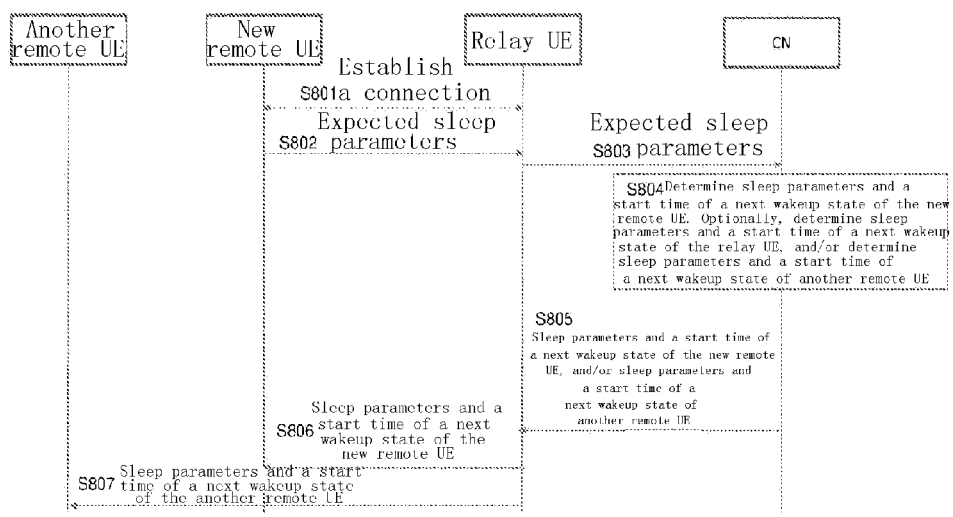
FIG. 8 is a signaling flow of a process of determining sleep parameters and a start time of a next wakeup state of a relay UE and a remote UE according to an embodiment of the present disclosure.

FIG. 8 is a signaling flowchart showing a process of determining sleep parameters and a start time of a next wakeup state of the relay UE and the remote UE according to the embodiment of the present disclosure. Reference is made to FIG. 8. In step S801, a new remote UE establishes a connection with the relay UE. In step S802, the new remote UE sends expected sleep parameters to the relay UE. In step S803, the relay UE forwards the expected sleep parameters of the new remote UE to the CN through satellite equipment. In step S804, the CN determines sleep parameters and a start time of a next wakeup state of the new remote UE according to the expected sleep parameters of the new remote UE. Alternatively, the CN may determine, according to the sleep parameters and the start time of the next wakeup state of the new remote UE, whether it is necessary to adjust the sleep parameters and the start time of the next wakeup state of the relay UE, and whether it is necessary to adjust sleep parameters and a start time of a next wakeup state of another remote UE. In a case that an adjustment is necessary, the CN determines the sleep parameters and the start time of the next wakeup state of the relay UE after the adjustment, and/or the sleep parameters and the start time of the next wakeup state of another remote UE after the adjustment. In step S805, the CN sends the sleep parameters and the start time of the next wakeup state of the new remote UE to the relay UE. Alternatively, in a case that the CN determines, in step S804, the sleep parameters and the start time of the next wakeup state of the relay UE after the adjustment, and/or the sleep parameters and the start time of the next wakeup state of another remote UE after the adjustment, the above-mentioned sleep parameters and the start time of the next wakeup state are also sent to the relay UE. In step S806, the relay UE forwards the sleep parameters and the start time of the next wakeup state of the new remote UE to the new remote UE. In step S807, the relay UE forwards the sleep parameters and the start time of the next wakeup state of the another remote UE to the another remote UE. As described above, in FIG. 8, the sleep parameters of the relay UE, the start time of the next wakeup state of the relay UE, the sleep parameters of the remote UE, and the start time of the next wakeup state of the remote UE are determined by the CN.

Figure 9:
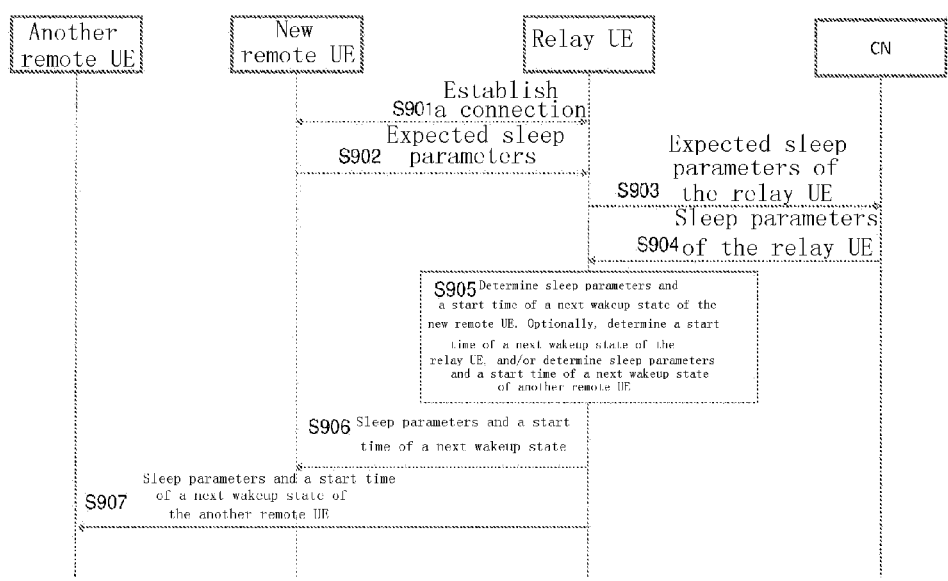
FIG. 9 is a signaling flow of a process of determining sleep parameters and a start time of a next wakeup state of a relay UE and a remote UE according to another embodiment of the present disclosure.

FIG. 9 is a signaling flowchart showing a process of determining sleep parameters and a start time of a next wakeup state of a relay UE and a remote UE according to another embodiment of the present disclosure. Reference is made to FIG. 9. In step S901, a new remote UE establishes a connection with the relay UE. In step S902, the new remote UE sends expected sleep parameters to the relay UE. In step S903, the relay UE determines, according to the expected sleep parameters of the new remote UE, whether it is necessary to adjust sleep parameters of the relay UE. In a case that an adjustment is required, the relay UE sends expected sleep parameters of the relay UE to the CN. In step S904, the CN determines sleep parameters of the relay UE according to the expected sleep parameters of the relay UE and sends the sleep parameters to the relay UE. In step S905, the relay UE determines sleep parameters and a start time of a next wakeup state of the new remote UE according to the expected sleep parameters of the new remote UE. Alternatively, in a case that the relay UE receives, in step S904, the sleep parameter of the relay UE adjusted by the CN, the relay UE may determine the start time of the next wakeup state of the relay UE. Further, alternatively, the relay UE may further determine whether it is necessary to adjust sleep parameters and a start time of a next wakeup state of another remote UE. In a case that an adjustment is necessary, the relay UE determines the sleep parameters and the start time of the next wakeup state of the another remote UE after the adjustment. In step S906, the relay UE sends the sleep parameters and the start time of the next wakeup state of the new remote UE to the new remote UE. In step S907, the relay UE sends the sleep parameters and the start time of the next wakeup state of the another remote UE to the another remote UE. As described above, in FIG. 9, the sleep parameters of the relay UE is determined by the CN, and the start time of the next wakeup state of the relay UE, the sleep parameters of the remote UE, and the start time of the next wakeup state of the remote UE are determined by the relay UE.

Figure 10:
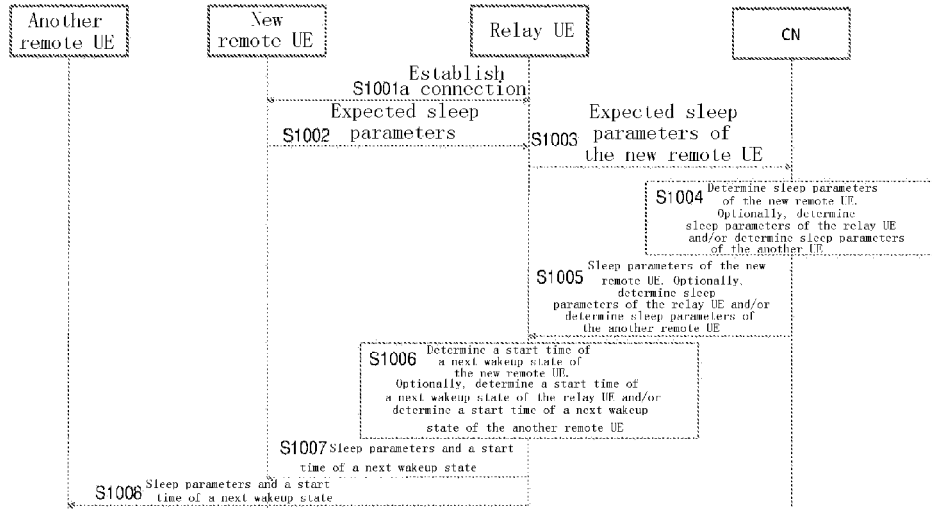
FIG. 10 is a signaling flow of a process of determining sleep parameters and a start time of a next wakeup state of a relay UE and a remote UE according to yet another embodiment of the present disclosure.

FIG. 10 is a signaling flowchart showing a process of determining sleep parameters and a start time of a next wakeup of a relay UE and a remote UE according to yet another embodiment of the present disclosure. Reference is made to FIG. 10. In step S1001, a new remote UE establishes a connection with the relay UE. In step S1002, the new remote UE sends expected sleep parameters to the relay UE. In step S1003, the relay UE sends the expected sleep parameters of the remote UE to the CN. In step S1004, the CN determines sleep parameters of the remote UE according to the expected sleep parameters of the remote UE. Alternatively, the CN may further determine whether it is necessary to adjust sleep parameters of the relay UE and whether it is necessary to adjust sleep parameters of another remote UE. In a case that the adjustment is necessary, the CN may further determine the sleep parameters of the relay UE after the adjustment, and/or determine the sleep parameters of another remote UE after the adjustment. In step S1005, the CN sends the sleep parameters of the new remote UE to the relay UE. Alternatively, the CN further sends the sleep parameters of the relay UE after the adjustment and/or the sleep parameters of another remote UE after the adjustment to the relay UE. In step S1006, the relay UE determines a start time of a next wakeup state of the new remote UE. Alternatively, the relay UE determines whether it is necessary to adjust the start time of the next wakeup state of the relay UE and whether it is necessary to adjust the start time of the next wakeup state of the another remote UE. In a case that the adjustment is necessary, the relay UE determines the start time of the next wakeup state of the relay UE after the adjustment, and/or determines the start time of the next wakeup state of the another remote UE after the adjustment. In step S1007, the relay UE sends the sleep parameters and the start time of the next wakeup state of the new remote UE to the new remote UE. In step S1007, the relay UE sends the sleep parameters and the start time of the next wakeup state of the another remote UE to the another remote UE. As described above, in FIG. 10, the sleep parameters of the relay UE and the sleep parameters of the remote UE are determined by the CN, and the start time of the next wakeup state of the relay UE and the start time of the next wakeup state of the remote UE are determined by the relay UE.

As described above, FIG. 8 to FIG. 10 shows three embodiments of determining the sleep parameters and the start time of the next wakeup state of the relay UE and the remote UE. No matter which method is applied to determine the sleep parameters and the start time of the next wakeup state of the relay UE and the remote UE, the core network can adjust the sleep parameters and the start time of the next wakeup state of the relay UE and the remote UE.

Figure 11:
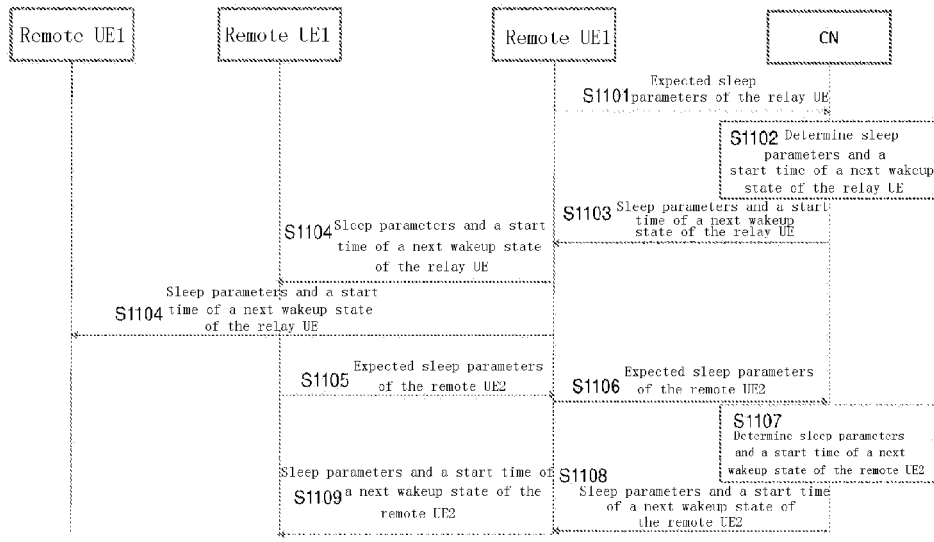
FIG. 11 is a signaling flow of a process of network side equipment adjusting sleep parameters and a start time of a next wakeup state of a relay UE and a remote UE according to an embodiment of the present disclosure.

FIG. 11 is a signaling flow chart showing a process of network side equipment adjusting sleep parameters and a start time of a next wakeup state of a relay UE and a remote UE according to an embodiment of the present disclosure. Reference is made to FIG. 11. In step S1101, before entering a sleep state each time, the relay UE determines a start time of a next wakeup state and determines whether there exists satellite equipment capable of serving the relay UE when the relay UE wakes up next, so as to determine whether the sleep parameters need to be adjusted. In a case that the satellite equipment capable of serving the relay UE is not existed, the relay UE may re-determine expected sleep parameters, including an expected duration of the sleep state and an expected duration of the wakeup state, and send the expected sleep parameters to the CN. Here, although the relay UE sends only the expected sleep parameters, the expected sleep parameters implicitly indicate an expected start time of a next wakeup state of the relay UE, since the expected duration of the sleep state actually determines the start time of the next wakeup state. In step S1102, the CN determines sleep parameters and a start time of a next wakeup state of the relay UE according to the expected sleep parameters of the relay UE. In step S1103, the CN sends the sleep parameters and the start time of the next wakeup state of the relay UE to the relay UE. In step S1104, the relay UE sends the sleep parameters and the start time of the next wakeup state of the relay UE after the adjustment to remote UE1 and remote UE2 serviced by the relay UE. In step S1105, each of the remote UE1 and the remote UE2 may determine whether it is necessary to adjust its sleep parameters according to the sleep parameters and the start time of the next wakeup state of the relay UE after adjustment. For example, in a case that the remote UE determines that the relay UE is in the sleep state when the remote UE is in the wakeup state, the remote UE may determine that it is necessary to adjust the sleep parameters. Assuming here that the remote UE2 determines that the sleep parameters need to be adjusted, then the remote UE2 may re-determine expected sleep parameters, including an expected duration of a sleep state and an expected duration of a wakeup state, and send the expected sleep parameters to the relay UE. Here, although the remote UE sends only the expected sleep parameters, the expected sleep parameters implicitly indicate an expected start time of a next wakeup state of the remote UE, since the expected duration of the sleep state actually determines the start time of the next wakeup state. In step S1106, the relay UE sends the expected sleep parameters of the remote UE2 to the CN. In step S1107, the CN determines the sleep parameters and the start time of the next wakeup state of the remote UE2 after the adjustment. In step S1108, the CN sends the sleep parameters and the start time of the next wakeup state of the remote UE2 to the relay UE. In step S1109, the relay UE sends the sleep parameters and the start time of the next wakeup state of the remote UE2 to the remote UE2.

It is worth noting that although some figures in this specification show a case where the remote UE sends uplink data and receives downlink data through the relay UE, the remote UE may perform one of uplink communication and downlink communication directly with the satellite equipment.

As mentioned above, in FIG. 1, due to the mismatch between the sleep parameters of the relay UE and the sleep parameters of the remote UE, there may be a situation in which the remote UE is in the wakeup state while the relay UE is in the sleep state, resulting in the remote UE being unable to communicate normally. According to the embodiments of the present disclosure, the sleep parameters and the start time of the next wakeup state of the remote UE are determined according to the sleep parameters and the start time of the next wakeup state of the relay UE, so as to ensure that the relay UE is in the wakeup state when the remote UE is in the wakeup state. In this way, the relay UE is enabled to service the remote UE, and energy of the remote UE and the relay UE can be saved in the NTN network.

Further, as described above, in FIG. 2, due to the mismatch between the sleep parameters of the relay UE and the satellite communication window, there may be a situation where the relay UE is in the wakeup state and there is no satellite equipment capable of serving the relay UE, resulting in that the relay UE cannot perform normal communicate. According to the embodiment of the present disclosure, the start time of the next wakeup state of the relay UE can be determined according to ephemeris information of the satellite, so that there exists satellite equipment serving the relay UE when the relay UE wakes up. In this way, the relay UE is enabled to communicate with the satellite equipment to service the remote UE, and energy of the remote UE and the relay UE can be saved in the NTN network.

3. Description of a Switching Process

Described above is determination of the sleep parameters and the start time of the next wakeup state of the relay user equipment and the remote user equipment. A process of user equipment switching a serving base station when there are relay services and sleep modes in the NTN network according to the embodiment of the present disclosure. It is to be noted that the handover process according to the embodiment of the present disclosure may be combined with the determination of the sleep parameters and the start time of the next wakeup state described above. That is, the sleep parameters and the start time of the next wakeup state of the relay user equipment and the remote user equipment are determined according to the method described above, and then a handover is performed as follows when the user equipment needs to perform the handover process. In addition, the handover process according to an embodiment of the present disclosure may be performed independently. That is, the sleep parameters and the start time of the next wakeup state of the relay user equipment and the remote user equipment can be determined according to other methods. That is, the handover process described below does not care how the sleep parameters and the start time of the next wakeup state of the user equipment are determined.

<3.1 Configuration Examples of Electronic Equipment for a Relay UE>

According to an embodiment of the present disclosure, the electronic equipment 600 can receive switching RRC reconfiguration information (HO RRC Reconfiguration Info) from a source serving base station of the electronic equipment 600 through the communication unit 620.

Here, the source serving base station of the electronic equipment 600 may be located on non-transparent satellite equipment, so that the electronic equipment 600 receives switching RRC reconfiguration information directly from the source serving base station. Alternatively, the source serving base station of the electronic equipment 600 may be located at the ground station, so that the electronic equipment 600 can receive, from transparent satellite equipment, the switching RRC reconfiguration information coming from the source serving base station. Similarly, the target serving base station may be located on non-transparent satellite equipment or in a ground station connected to a transparent satellite equipment. In addition, in a case that a CU (Central Unit) and a DU (Distributed Unit) are disposed separately, the source serving base station and a target serving base station of the electronic equipment may be different DU devices connected to a same CU, that is, the electronic equipment 600 switches among different DU devices.

According to an embodiment of the present disclosure, the switching RRC reconfiguration information received by the electronic equipment 600 from the source serving base station may include the switching RRC reconfiguration information of the electronic equipment 600 and all remote user equipment serviced by the electronic equipment 600.

According to an embodiment of the present disclosure, the electronic equipment 600 may further include a measurement unit 670. The measurement unit 670 is configured to perform cell handover measurement. That is, the measurement unit 670 can measure a channel quality between adjacent cells, such as measuring parameters such as signal strength from the base station of adjacent cells. Here, the measurement unit 670 can use any method known in the art to perform measurement for cell handover, which is not limited in the present disclosure.

According to an embodiment of the present disclosure, the electronic equipment 600 may further include a generating unit 660. The generating unit 660 is configured to generate a measurement report based on the measurement results of the measurement unit 670. The measurement report may include, for example, a channel quality of a current serving cell of the electronic equipment 600 and a channel quality of adjacent cells. Further, the electronic equipment 600 may send a measurement report generated by the generating unit 660 to the source serving base station through the communication unit 620, for the source serving base station to perform handover determination according to the measurement report, and send switching RRC reconfiguration information to the electronic equipment 600 when it is determined to perform cell handover (that is, switching a serving base station of the electronic equipment 600 from the source serving base station to the target serving base station). Alternatively, the generating unit 660 may further generate location information of the electronic equipment 600. Further, the electronic equipment 600 may send the location information generated by the generating unit 660 to the source serving base station through the communication unit 620, for the source serving base station to perform handover determination based on the location information.

As shown in FIG. 6, the electronic equipment 600 may include a state determination unit 640. The state determination unit 640 is configured to determine whether each remote user equipment serviced by the electronic equipment 600 is in a sleep state or a wakeup state. Here, the state determination unit 640 may determine whether each remote user equipment is in a sleep state or a wakeup state at a current time instant according to sleep parameters and a start time of a next wakeup state of the remote user equipment. Further, for remote user equipment in the wakeup state, the electronic equipment 600 can send switching RRC reconfiguration information of the remote user equipment to the remote user equipment through the communication unit 620.

According to an embodiment of the present disclosure, as shown in FIG. 6, the electronic equipment 600 may further include a storage unit 650. The storage unit 650 saves the switching RRC reconfiguration information of the remote user equipment in the sleep state. Here, for any remote user equipment, the storage unit 650 updates the switching RRC reconfiguration information of the remote user equipment in a case that the switching RRC reconfiguration information of the remote user equipment is previously stored in the storage unit 650. That is, in a case that the serving base station of the electronic equipment 600 switched several times during a time period when the remote user equipment is in a sleep state, the storage unit 650 saves only latest switching RRC reconfiguration information of the remote user equipment.

According to an embodiment of the present disclosure, after the remote user equipment in the sleep state wakes up, the electronic equipment 600 sends the switching RRC reconfiguration information of the remote user equipment stored in the storage unit 650 to the remote user equipment through the communication unit 620.

According to an embodiment of the present disclosure, the remote user equipment in the sleep state re-establishes a connection with the electronic equipment 600 after waking up, so that the electronic equipment 600 sends the switching RRC reconfiguration information to the remote user equipment in response to re-establishment of the connection.

As described above, according to the embodiment of the present disclosure, during a process of the electronic equipment 600 performing switching of the serving base station, the electronic equipment 600 may save the switching RRC reconfiguration information for the remote user equipment in the sleep state, and send the switching RRC reconfiguration information again after the remote user equipment in the sleep state wakes up. In this way, the electronic equipment 600 and the remote user equipment in the wakeup state can switch the serving base station from the source serving base station to the target serving base station according to the switching RRC reconfiguration information, and the remote user equipment, when wakes up from the sleep state, can switch the serving base station from the source serving base station to the target serving base station according to the switching RRC reconfiguration information.

Described above is a process of switching a serving base station that is performed through handover measurement when the electronic equipment 600 is in the wakeup state. This process can be referred to as an "active switching of the serving base station" of the electronic equipment 600. The following describes in detail a process of switching a serving base station for the electronic equipment 600 due to movement of satellite equipment, when the electronic equipment 600 enters the sleep state and then wakes up. This process may be referred to as a "passive switching of the serving base station" of the electronic equipment 600.

According to an embodiment of the present disclosure, the electronic equipment 600, after enters a sleep state and wakes up, can re-establish a connection with a new serving base station. For example, the electronic equipment 600 may send an RRC connection resume request to the new serving base station through the communication unit 620. After the new serving base station obtains context information of the electronic equipment 600 from the source serving base station, the electronic equipment 600 receives RRC connection resume information from the new serving base station, so as to be connected to the new serving base station.

According to an embodiment of the present disclosure, one or more remote user equipment serviced by the electronic equipment 600 may be in a sleep state when the electronic equipment 600 is connected to the new serving base station. After the remote user equipment wakes up, the electronic equipment 600 may receive the RRC connection resume request from the remote user equipment through the communication unit 620.

According to an embodiment of the present disclosure, the RRC connection resume request includes a source serving base station of the remote user equipment. Here, the source serving base station refers to a serving base station before the remote user equipment enters the sleep state. In a case that the electronic equipment 600 switched over the serving base station for many times during the sleep state of the remote user equipment, the source serving base station of the remote user equipment may be different from the source serving base station of the electronic equipment 600. Therefore, the remote user equipment needs to notify its source serving base station through the RRC connection resume request.

According to an embodiment of the present disclosure, the electronic equipment 600 may forward the RRC connection resume request of the remote user equipment to a current serving base station through the communication unit 620, so that the current serving base station of the electronic equipment 600 requests a context of the remote user equipment from the source serving base station of the remote user equipment.

According to an embodiment of the present disclosure, after the current serving base station of the electronic equipment 600 obtains the context of the remote user equipment, the electronic equipment 600 may receive RRC connection resume (RRC Connection Resume) information of the remote user equipment from the serving base station of the electronic equipment 600 through the communication unit 620, and forward the RRC connection resume information to the remote user equipment.

As described above, after the "passive switching of the serving base station" of the electronic equipment 600, the remote user equipment, after wakes up from the sleep state, can switch the serving base station of the remote user equipment to the current serving base station of the electronic equipment 600 by sending the RRC connection resume request including the source serving base station of the remote user equipment.

According to an embodiment of the present disclosure, during the "active switching of the serving base station" of the electronic equipment 600, the electronic equipment 600 may perform cell measurement, for the source serving base station to perform switching determination, that is, to determine whether to switch the serving base station of the electronic equipment 600 to another serving base station and to which target serving base station.

According to an embodiment of the present disclosure, the state determination unit 640 may determine whether the remote user equipment serviced by the electronic equipment 600 is in a sleep state or a wakeup state. In addition, the electronic equipment 600 may further determine whether the remote user equipment has a hybrid connection. Here, the remote user equipment having a hybrid connection refers to that the remote user equipment performs one of uplink communication and downlink communications with satellite equipment through the electronic equipment 600, and performs the other one of the uplink communication and downlink communications directly with the satellite equipment.

According to an embodiment of the present disclosure, as shown in FIG. 6, the electronic equipment 600 may further include a generating unit 680. The generating unit 680 is configured to generate a measurement instruction for remote user equipment that is in a wakeup state, has a hybrid connection, and is serviced by the electronic equipment 600, to instruct the remote user equipment to perform a switching measurement. The switching measurement here represents a measurement for cell switching. For example, the remote user equipment may measure a channel quality of channels of an adjacent cell, for example, by measuring strength of a signal from a base station of the adjacent cell and other parameters. Here, the remote user equipment may perform the measurement for cell switching through any method known in the art, which is not limited in the present disclosure. Further, the electronic equipment 600 may send, through the communication unit 620, a measurement instruction to the remote user equipment that is in a wakeup state, has a hybrid connection, and is serviced by the electronic equipment 600.

According to an embodiment of the present disclosure, the measurement unit 670 performs switching measurement. That is, the measurement unit 670 and the remote user equipment that is in a wakeup state and has a hybrid connection perform the measurement for cell switching respectively and independently from each other.

According to an embodiment of the present disclosure, the electronic equipment 600 may receive, through the communication unit 620, a measurement result of the remote user equipment that is in the wakeup state, has a hybrid connection, and is serviced by the electronic equipment 600 from the remote user equipment. Further, the generating unit 660 may generate a measurement result, which includes a measurement result of the measurement unit 670 of the electronic equipment 600 and received measurement result from the remote user equipment. Further, the electronic equipment 600 may send the measurement result generated by the generating unit 660 to the source serving base station of the electronic equipment 600 through the communication unit 620. In this way, the source serving base station can perform switching determination according to the received measurement result, so that a target serving base station which provides a better channel quality for the electronic equipment 600 and all the remote user equipment that is in a wakeup state, has a hybrid connection, and is serviced by the electronic equipment 600 can be selected.

According to an embodiment of the present disclosure, for the remote user equipment that is in a wakeup state, has a hybrid connection, and is serviced by the electronic equipment 600, the generating unit 680 may generate the measurement instruction after the remote user equipment wakes up, to instruct the remote user equipment to measure a channel quality of a channel between the remote user equipment and satellite equipment after switching (In this case, the electronic equipment 600 is switched to the target serving base station, and thus the serving satellite equipment is changed. Such measurement may be used to measure the channel quality of the channel between the remote user equipment and the target serving base station). Further, the electronic equipment 600 may send the measurement instruction generated by the generating unit 680 to the remote user equipment through the communication unit 620.

According to an embodiment of the present disclosure, the electronic equipment 600 may send the measurement instruction to the remote user equipment that is in a wakeup state and has a hybrid connection after the remote user equipment wakes up, re-establishes a connection with the electronic equipment 600, and finishes an RRC reconfiguration. Thereby, the remote user equipment can measure the channel quality of the channel between the remote user equipment and the target serving base station.

According to an embodiment of the present disclosure, the electronic equipment 600 may receive a measurement result from the remote user equipment through the communication unit 620, and determine whether to allow a direct connection between the remote user equipment and new satellite equipment according to the measurement result. For example, in a case that the measurement result shows that the channel quality of the channel between the remote user equipment and the target serving base station is good, it can be determined to allow the direct connection between the remote user equipment and the new satellite equipment. In a case that the measurement result shows that the channel quality of the channel between the remote user equipment and the target serving base station is poor, it may be determined to not allow the direct connection between the remote user equipment and the new satellite equipment. Further, the electronic equipment 600 may inform the remote user equipment of the determination result through the communication unit 620. In this way, in a case that the determination result indicates that the direct connection between the remote user equipment and the new satellite equipment is not allowed, the remote user equipment may determine another satellite equipment to establish a direct connection. In this case, the remote user equipment may perform one of uplink communication and downlink communication with the satellite equipment serving the electronic equipment 600 through the electronic equipment 600, and perform the other one of the uplink communication and the downlink communication directly with another satellite equipment.

In addition, according to an embodiment of the present disclosure, without the CA (Carrier Aggregation) technology applied in the wireless communication system, there is only one service cell for the electronic equipment 600 and the remote user equipment, and the measurement of the electronic equipment 600 and the remote user equipment is aimed at this service cell. With the CA technology applied in the wireless communication system, there are multiple service cells for electronic equipment 600 and the remote user equipment, and the measurement of the electronic equipment 600 and the remote user equipment is aimed at a master service cell.

As described above, according to the embodiments of the present disclosure, when the electronic equipment 600 performs the measurement for cell switching, the electronic equipment 600 may instruct the remote user equipment that is in a wakeup state, has a hybrid connection, and is serviced by the electronic equipment 600 to perform measurement for cell switching as well. In this way, the source serving base station, when performing the switching determination, can comprehensively consider both the measurement result of the electronic equipment 600 and the measurement result of the remote user equipment, so that a quality of a direct connection between the remote user equipment having the hybrid connection and the target serving base station is not so poor. In addition, for remote user equipment that is in a sleep state and has a hybrid connection, the direct connection can be measured after the remote user equipment wakes up, so as to determine whether to use the direct connection with the target serving base station.

<3.2 Configuration Examples of Electronic Equipment for a Remote UE>

According to an embodiment of the present disclosure, as shown in FIG. 7, the electronic equipment 700 may further include a connection unit 740. The connection unit 740 is configured to reconnect to the relay user equipment after the electronic equipment 700 enters a sleep state and wakes up. The mentioned relay user equipment services the electronic equipment 700 before the electronic equipment 700 enters the sleep state.

According to an embodiment of the present disclosure, the electronic equipment 700 may receive switching RRC reconfiguration information of the electronic equipment 700 from the relay user equipment through the communication unit 710.

According to an embodiment of the present disclosure, as shown in FIG. 7, the electronic equipment 700 may further include a determination unit 750. In a case that switching RRC reconfiguration information is received by the electronic equipment 700, the determination unit 750 may determine that the serving base station of the relay user equipment is switched during the sleep state of the electronic equipment 700, and the relay user equipment saves the switching RRC reconfiguration information of the electronic equipment 700. Further, the electronic equipment 700 may perform RRC reconfiguration according to the received switching RRC reconfiguration information, and may send switching RRC reconfiguration complete information (HO RRC reconfiguration complete) to the relay user equipment through the communication unit 710 after the RRC reconfiguration. In this way, the serving base station of the electronic equipment 700 is switched to the serving base station of the electronic equipment 700, so that the electronic equipment 700 can communicate with the new serving base station through the relay user equipment.

According to an embodiment of the present disclosure, in a case that no switching RRC reconfiguration information is received from the relay user equipment, the determination unit 750 may determine that the serving base station of the relay user equipment is switched during the sleep state of the electronic equipment 700, and the relay user equipment does not save switching RRC reconfiguration information of the electronic equipment 700. For example, the determination unit 750 may set a timer. In a case that the determination unit 750 fails to receive the RRC reconfiguration information after the timer expires, the determination unit 750 determines that the serving base station of the relay user equipment is switched during the sleep state of the electronic equipment 700, and the relay user equipment does not save the switching RRC reconfiguration information of the electronic equipment 700.

In this case, the electronic equipment 700 may send RRC connection resume request to the relay user equipment through the communication unit 710. The RRC connection resume request includes information of a source serving base station of the electronic equipment 700, such as an identification of the source serving base station of the electronic equipment 700. Further, the electronic equipment 700 may receive RRC connection resume information from the relay user equipment through the communication unit 710. In this way, the electronic equipment 700 may switch the serving base station to a current serving base station of the relay user equipment, and thereby communicate with the new serving base station through the relay user equipment.

As described above, according to the embodiments of the present disclosure, the electronic equipment 700 in a sleep state can re-establish a connection with the relay user equipment after waking up. In a case that the relay user equipment performs the "active switching of the serving base station", the electronic equipment 700 may switch the serving base station to the current serving base station of the relay user equipment according to the switching RRC reconfiguration information. In a case that the relay user equipment performs the "passive switching of the serving base station", the electronic equipment 700 may switch the serving base station of the electronic equipment 700 to the current serving base station of the relay user equipment by sending the RRC connection resume request including the source serving base station of the electronic equipment 700.

According to an embodiment of the present disclosure, as shown in FIG. 7, the electronic equipment 700 may further include a measurement unit 760. The measurement unit 760 is configured to perform measurement for cell switching after measurement instruction from the relay user equipment instructing the electronic equipment 700 to perform switching measurement is received. For example, the measurement unit 760 may measure a channel quality of an adjacent cell, for example, by measuring strength of a signal from a base station of the adjacent cell and other parameters. Here, the measurement unit 760 may perform the measurement for cell switching through any method known in the art, which is not limited in the present disclosure.

According to an embodiment of the present disclosure, as shown in FIG. 7, the electronic equipment 700 may further include a generating unit 770. The generating unit 770 is configured to generate a measurement result. Further, the electronic equipment 700 may further send the measurement result generated by the generating unit 770 to the relay user equipment through the communication unit 710, so that the relay user equipment forwards the measurement result to the source serving base station.

According to an embodiment of the present disclosure, after the measurement instruction from the relay user equipment instructing the electronic equipment 700 to measure the channel quality between the electronic equipment and the current serving base station of the relay user equipment is received, the channel quality between the electronic equipment 700 and the current serving base station of the relay user equipment is measured. The current serving base station of the relay user equipment here refers to a new serving base station to which the relay user equipment switches when the electronic equipment 700 is in the sleep state. Further, the generating unit 770 may generate the measurement result, and the electronic equipment 700 may send the measurement result generated by the generating unit 770 to the relay user equipment through the communication unit 710, for the relay user equipment to determine whether to allow a direct connection between the electronic equipment 700 and the current serving base station of the relay user equipment.

According to an embodiment of the present disclosure, in a case that the relay user equipment does not allow the direct connection between the electronic equipment 700 and the current serving base station of the relay user equipment, the electronic equipment 700 may determine another target serving base station according to the measurement result of cell switching, and establish a direct connection with the another target serving base station. That is, the electronic equipment 700 may perform one of uplink communication and downlink communication through a direct connection with another target serving base station, and perform the other one of the uplink communication and the downlink communication with the current serving base station of the relay user equipment through the relay user equipment.

As described above, according to an embodiment of the present disclosure, the electronic equipment 700 that is in the wakeup state and has a hybrid connection can also perform the measurement for cell switching. In this way, both the measurement result of the relay user equipment and the measurement result of the electronic equipment 700 can be comprehensively considered when the source serving base station performs determination on the cell switching, so that the quality of the direct link between the electronic equipment 700 having the hybrid connection and the target serving base station is not so poor. In addition, for the electronic equipment 700 that is in a sleep state and has a hybrid connection, the direct link may be measured after the electronic equipment 700 wakes up, so as to determine whether to use the direct link to the target serving base station.

<3.3 Configuration Examples of Electronic Equipment in a Core Network>

According to an embodiment of the present disclosure, as shown in FIG. 5, the electronic equipment 500 may further include an estimating unit 540. The estimating unit 540 is configured to estimate a target serving base station of the relay user equipment according to sleep parameters of the relay user equipment. Specifically, the estimating unit 540 may perform estimation during a time period when the relay user equipment is in a sleep state, that is, before the relay user equipment wakes up. Further, the estimating unit 540 may estimate a new serving base station (the target serving base station) that services the relay user equipment after the relay user equipment wakes up according to ephemeris information of satellite equipment and location information of the relay user equipment.

According to an embodiment of the present disclosure, as shown in FIG. 5, the electronic equipment 500 may further include a generating unit 550. The generating unit 550 is configured to generate a context retrieve request (Context Retrieve Request). The context retrieve request includes the source serving base station of the relay user equipment. Further, the electronic equipment 500 may send, through the communication unit 520, the context retrieve request to the target serving base station of the relay user equipment estimated by the estimating unit 540. In this way, the target serving base station can request for a context of the relay user equipment from the source serving base station of the relay user equipment included in the context retrieve request.

Further, the electronic equipment 500 may further receive, through the communication unit 520, a path switching request of the relay user equipment from the target serving base station. The path switching request indicates that the target serving base station expects to switch a path of the relay user equipment to the target serving base station. In a case that the electronic equipment 500 receives the path switching request, it indicates that the target serving base station has successfully obtained the context of the relay user equipment.

According to an embodiment of the present disclosure, as shown in FIG. 5, the electronic equipment 500 may further include a switching unit 560. The switching unit is configured to switch the path of the relay user equipment to the target serving base station.

According to a conventional switching of a serving base station for relay user equipment, it is necessary to send an RRC connection resume request to a target serving base station after the relay user equipment wakes up, then the target serving base station obtains context information of the relay user equipment, and requests to switch a path of the relay user equipment. As described above, according to an embodiment of the present disclosure, when the relay user equipment is in a sleep state, the electronic equipment 500 may estimate a target serving base station after the relay user equipment wakes up, so that the target serving base station can obtain context information of the relay user equipment in advance and request to switch the path of the relay user equipment. In this way, the relay user equipment, after wakes up, can directly switch to the target serving base station. Therefore, a time period for switching is greatly reduced and a switching efficiency is improved.

According to an embodiment of the present disclosure, the above process is applicable to the remote user equipment serviced by the relay user equipment.

That is, the generating unit 550 may generate a context retrieve request including the source serving base station of the remote user equipment, and the electronic equipment 500 may send the context retrieve request to a target serving base station through the communication unit 520, so that the target serving base station requests for a context of the remote user equipment from the source serving base station of the remote user equipment. Further, the electronic equipment 500 may receive, through the communication unit 520, a path switching request of the remote user equipment from the target serving base station. Further, the switching unit 560 may switch a path of the remote user equipment to the target serving base station.

According to a conventional switching of a serving base station for remote user equipment, it is necessary to send an RRC connection resume request to the relay user equipment after the remote user equipment wakes up, then the target serving base station obtains context information of the remote user equipment, and requests to switch a path of the remote user equipment. As described above, according to an embodiment of the present disclosure, when the relay user equipment is in a sleep state (in this case, the remote user equipment is also in a sleep state), the electronic equipment 500 may estimate a target serving base station after the relay user equipment wakes up, so that the target serving base station can obtain context information of the remote user equipment in advance and request to switch the path of the remote user equipment. In this way, the remote user equipment, after wakes up, can directly switch to the target serving base station. Therefore, a time period for switching is greatly reduced and a switching efficiency is improved.

Figure 12:
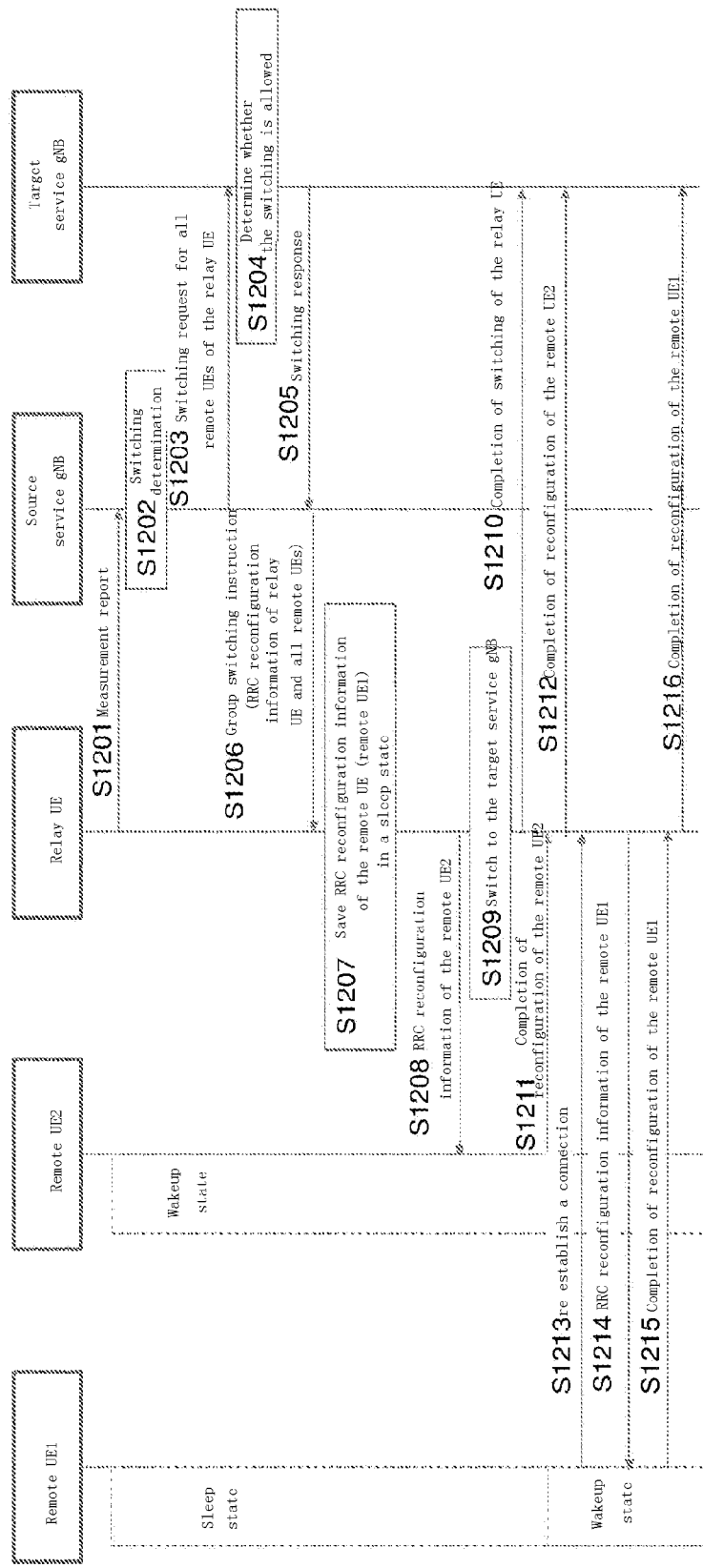
FIG. 12 is a signaling flow of a process of a relay UE switching a serving base station according to an embodiment of the present disclosure.
Figure 13:
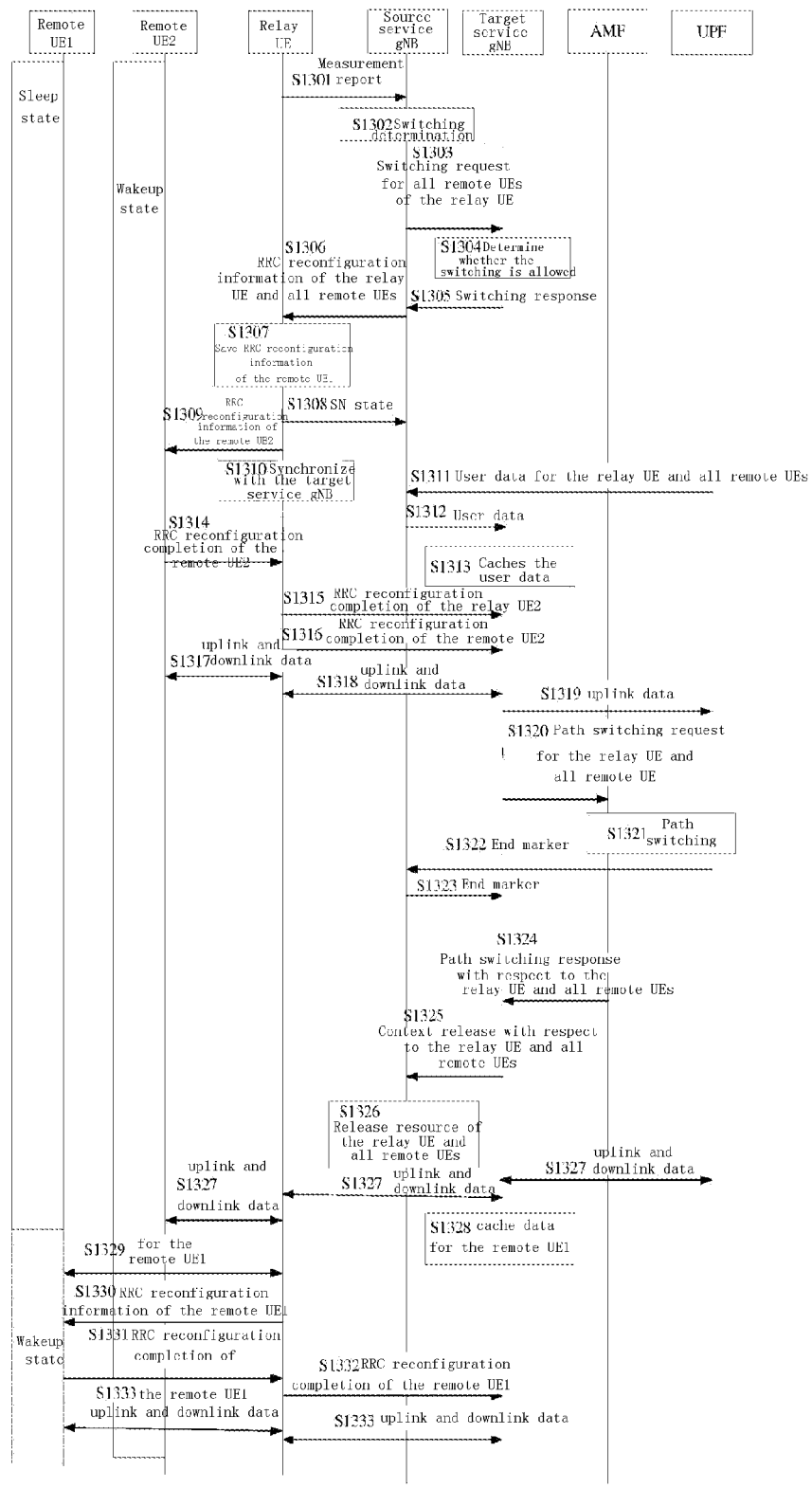
FIG. 13 is a signaling flow of a process of a relay UE switching a serving base station according to another embodiment of the present disclosure.

A signaling flow of a process of an "active switching of a serving base station" of relay user equipment is described below with reference to FIG. 12 to FIG. 13. In FIG. 12 to FIG. 13, the relay UE may be implemented by the electronic equipment 600, the remote UE may be implemented by the electronic equipment 700, and the AMF (Access and Mobility Management Function) and UPF (User Port Function) may be located in a core network, for example, included in the electronic equipment 500. The AMF is used to perform functions at a management level, and the UPF is used to perform functions at a user level. In addition, a source service gNB and a target service gNB may be located on the non-transparent satellite equipment or in a ground station connected with transparent satellite equipment.

FIG. 12 is a signaling flow of a process of a relay UE switching a serving base station according to an embodiment of the present disclosure. Reference is made to FIG. 12. In step S1201, a relay UE performs measurement for cell switching and sends a measurement report to a source service gNB. In step S1202, the source service gNB performs switching determination according to the measurement report of the relay UE. For example, the source service gNB determines a target service gNB. In step S1203, the source service gNB sends, to the target service gNB, a switching request with respect to the relay UE and all remote UEs serviced by the relay UE. In step S1204, the target service gNB determines whether to allow access of the relay UE and all remote UEs serviced by the relay UE. In step S1205, the target service gNB sends, to the source service gNB, a switching response indicating that the switching is allowed. In step S1206, the source service gNB sends, to the relay UE, a group switching instruction including switching RRC reconfiguration information of the relay UE and the all remote UEs. In step S1207, the relay UE determines states of each of the remote UEs. Here, a remote UE1 is in a sleep state, and a remote UE2 is in a wakeup state. Then the relay UE saves switching RRC reconfiguration information of the remote UE1. In step S1208, the relay UE sends the switching RRC reconfiguration information of the remote UE2 to the remote UE2. In step S1209, the relay UE switches to the target service gNB. In step S1210, the relay UE sends switching completion information to the target service gNB. In step S1211, the remote UE2 sends RRC reconfiguration completion information to the relay UE. In step S1212, the relay UE forwards the RRC reconfiguration completion information of the remote UE2 to the target service gNB. Therefore, the relay UE and the remote UE2 are switched to the target service gNB successfully.

Next, after the remote UE1 wakes up, the remote UE1 re-establishes a connection with the relay UE in step S1213. In step S1214, the relay UE sends the saved RRC reconfiguration information of the remote UE1 to the remote UE1. In step S1215, the remote UE1 sends RRC reconfiguration completion information to the relay UE. In step S1216, the relay UE forwards the RRC reconfiguration completion information of the remote UE1 to the target service gNB. Therefore, the remote UE1 is switched to the target service gNB successfully.

FIG. 13 is a signaling flow of a process of a relay UE switching serving base station according to another embodiment of the present disclosure. Reference is made to FIG. 13. In step S1301, the relay UE performs measurement for cell switching and sends a measurement report to the source service gNB. In step S1302, the source service gNB performs switching determination according to the measurement report of the relay UE. For example, the source service gNB determines a target service gNB. In step S1303, the source service gNB sends, to the target service gNB, a switching request with respect to the relay UE and all remote UEs serviced by the relay UE. In step S1304, the target service gNB determines whether to allow access of the relay UE and all remote UEs serviced by the relay UE. In step S1305, the target service gNB sends, to the source service gNB, a switching response indicating that the switching is allowed. In step S1306, the source service gNB sends switching RRC reconfiguration information of the relay UE and the all remote UEs to the relay UE. In step S1307, the relay UE determines that a remote UE1 is in a sleep state, and thus saves switching RRC reconfiguration information of the remote UE1. In step S1308, the relay UE sends an SN state to the source service gNB. In step S1309, the relay UE determines that a remote UE2 is in a wakeup state, and thus sends the switching RRC reconfiguration information to the remote UE2. In step S1310, the relay UE is synchronized with the target gNB. In step S1311, in a case that a UPF sends user data for the relay UE and all remote UEs to the source service gNB, the source service gNB forwards the user data to the target gNB in step S1312. In step S1313, the target service gNB caches the received data. In step S1314, the remote UE2 sends RRC reconfiguration completion information to the relay UE. In step S1315, the relay UE sends RRC reconfiguration completion information of the relay UE to the target service gNB. In step S1316, the relay UE forwards RRC reconfiguration completion information of the remote UE2 to the target service gNB. Therefore, the remote UE2 and the relay UE can send uplink data normally in steps S1317, S1318 and S1319. In addition, since the relay UE and the remote UE2 are switched to the target gNB, the target service gNB can forward the previously cached downlink data for the relay UE and the remote UE2 to the relay UE and the remote UE2 in steps S1317 and S1318. In this case, the AMF and UPF in the core network perform no path switching, and therefore the AMF and UPF cannot send downlink data to the target service gNB. In step S1320, the target service gNB sends a path switching request to the AMF to request to switch paths of the relay UE and all remote UEs. In step S1321, the AMF and UPF perform path switching. In step S1322, the UPF sends an end marker (End Marker) to the source service gNB. In step S1323, the source service gNB forwards the end marker to the target service gNB. In step S1324, the AMF sends, to the target service gNB, a path switching response with respect to the relay UE and all remote UEs. In step S1325, the target service gNB sends context release information to the source service gNB, to request the source service gNB to release a context of the relay UE and all remote UEs. In step S1326, the source service gNB releases the context of the relay UE and all remote UEs. Therefore, the relay UE and the remote UE2 can perform uplink and downlink communication normally in step S1327. In a case that there is data for the remote UE1, as the remote UE1 is not switched to the target service gNB, the target service gNB caches the data in step S1328.

Next, in step S1329, after the remote UE1 wakes up, the remote UE1 is reconnected to the relay UE. In step S1330, the relay UE sends, to the remote UE1, previously saved switching RRC reconfiguration information of the remote UE1. In step S1331, the remote UE1 sends RRC reconfiguration completion information to the relay UE. In step S1332, the relay UE forwards RRC reconfiguration completion information of the remote UE1 to the target service gNB. In step S1333, the remote UE1 can perform uplink and downlink communication normally with the target service gNB through the relay UE.

Figure 14:
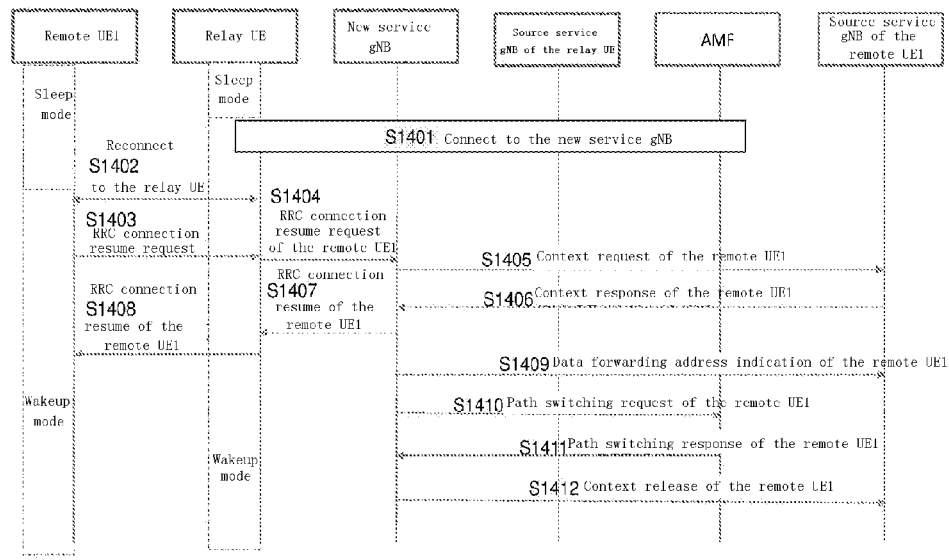
FIG. 14 is a signaling flow of a process of connecting a remote UE to a new serving base station after a relay UE is connected to the new serving base station according to an embodiment of the present disclosure.
Figure 15:
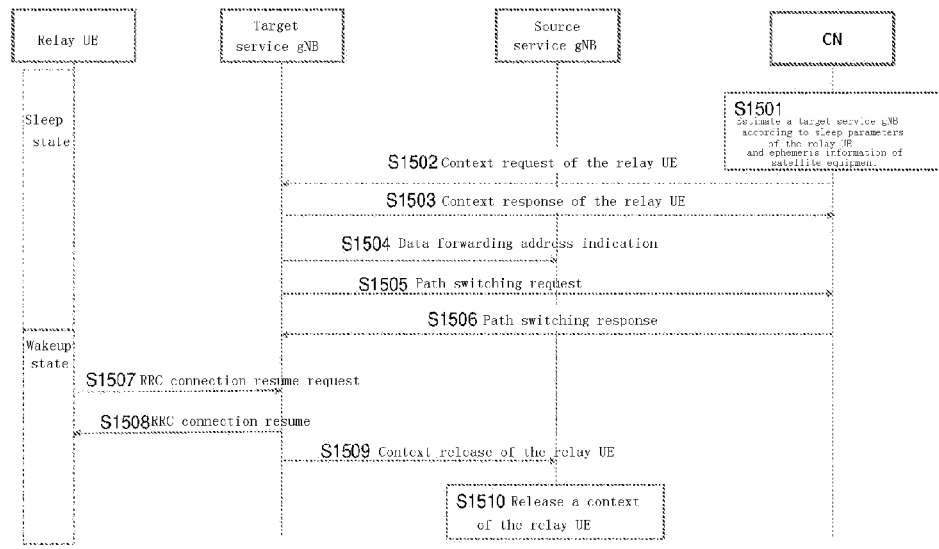
FIG. 15 is a signaling flow of a process of connecting a relay UE to a new serving base station according to an embodiment of the present disclosure.
Figure 16:
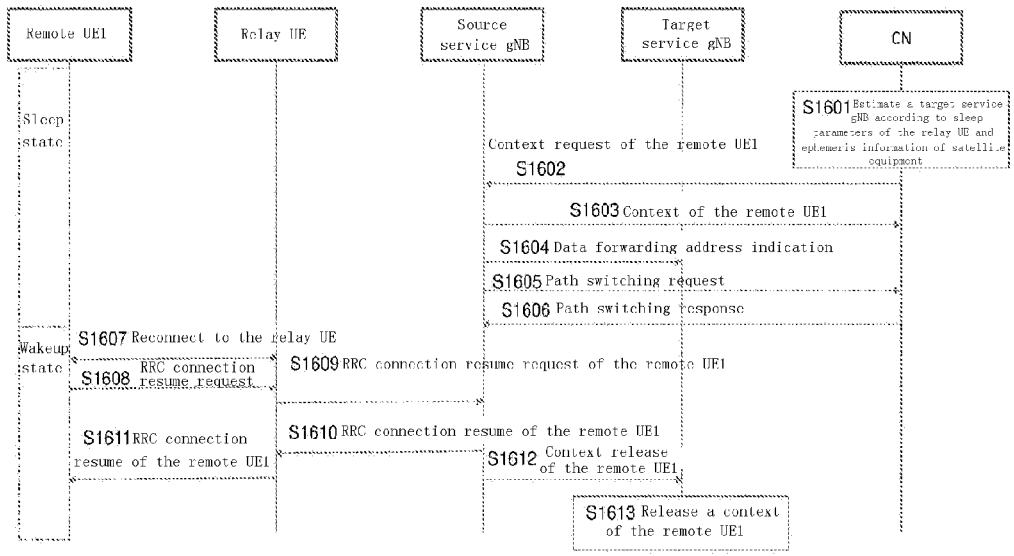
FIG. 16 is a signaling flow of a process of connecting a remote UE to a new serving base station after a relay UE is connected to the new serving base station according to an embodiment of the present disclosure.

A signaling flow of a process of a "passive switching of a serving base station" of relay user equipment is described below with reference to FIG. 14 to FIG. 16. In FIG. 14 to FIG. 16, the relay UE may be implemented by the electronic equipment 600, the remote UE may be implemented by the electronic equipment 700, and the AMF may be included in the electronic equipment 500 in a core network. In addition, the source service gNB and target service gNB may be located on non-transparent satellite equipment or in a ground station connected with transparent satellite equipment.

FIG. 14 is a signaling flow of a process of connecting a remote UE to a new serving base station after a relay UE is connected to the serving base station according to an embodiment of the present disclosure. Reference is made to FIG. 14. In step S1401, the relay UE, after enters a sleep mode and wakes up, is connected to a new service gNB and performs uplink and downlink communication normally. After a remote UE1 enters a sleep mode and wakes up, the remote UE1 is reconnected to the relay UE in step S1402. In step S1403, the remote UE1 sends, to the relay UE, an RRC connection resume request including a source service gNB of the remote UE1. In step S1404, the relay UE forwards the RRC connection resume request of the remote UE1 to the new service gNB. In step S1405, the new service gNB determines a source service gNB of the remote UE1 according to the RRC connection resume request of the remote UE1, and requests for context request of the remote UE1 from the source service gNB of the remote UE1. In step S1406, the source service gNB of the remote UE1 sends, to the new service gNB of the relay UE, a context response of the remote UE1 including a context of the remote UE1. In step S1407, the new service gNB sends RRC connection resume information of the remote UE1 to the relay UE. In step S1408, the relay UE forwards the RRC connection resume information to the remote UE1. In step S1409, the new service gNB sends a data forwarding address indication of the remote UE1 to the source service gNB of the remote UE1, to request for sending data of the remote UE1 to the new service gNB. In step S1410, the new service gNB sends a path switching request of the remote UE1 to the AMF, to request to switch a path of the remote UE1 to the new service gNB. In step S1411, the AMF sends a path switching response of remote UE1 to the new service gNB. In step S1412, the new service gNB sends context release information of the remote UE1 to the source service gNB of the remote UE1, to request the source service gNB of the remote UE1 to release a context of the remote UE1. Therefore, the remote UE1 is switched to the new service gNB.

FIG. 15 is a signaling flow of a process of connecting a relay UE to a new serving base station according to an embodiment of the present disclosure. FIG. 15 shows an improvement on the process of connecting the relay UE to the new service gNB as shown in step S1401 in FIG. 14. Reference is made to FIG. 15. In step S1501, when the relay UE is in a sleep state, a CN estimates a target service gNB of the relay UE after the relay UE wakes up according to sleep parameters of the relay UE and ephemeris information of satellite equipment. In step S1502, the CN sends, to the target service gNB, a context request of the relay UE including a source service gNB of the relay UE. In step S1503, the target service gNB sends a context response of the relay UE to the CN. In step S1504, the target service gNB sends a data forwarding address indication to the source service gNB, to instruct the source service gNB to forward data of the relay UE to the target service gNB. In step S1505, the target service gNB sends a path switching request of the relay UE to the CN, to request to switch a path of the relay UE to a target service gNB. In step S1506, the CN sends a path switching response to the target service gNB. Thus, during the sleep state of the relay UE, the target service gNB obtains a context of the relay UE, and the path of the relay UE is switched to the target service gNB. In step S1507, the relay UE, after wakes up, sends an RRC connection resume request to the target service gNB. In step S1508, the target service gNB sends RRC connection resume information to the relay UE. In step S1509, the target service gNB sends context release information of the relay UE to the source service gNB. In step S1510, the source service gNB releases the context of the relay UE. Therefore, the relay UE can be switched to the target service gNB quickly after waking up.

FIG. 16 is a signaling flow of a process of connecting a remote UE to a new serving base station after a relay UE is connected to the new serving base station according to an embodiment of the present disclosure. FIG. 16 shows an improvement on the process of connecting a remote UE to a new service gNB as shown in steps S1402 to S1412 in FIG. 14. Reference is made to FIG. 16. In step S1601, when a relay UE and a remote UE are in a sleep state, a CN estimates a target service gNB after the relay UE wakes up according to sleep parameters of the relay UE and ephemeris information of satellite equipment. In step S1602, the CN sends, to the target service gNB, a context request of a remote UE, including a source service gNB of the remote UE. In step S1603, the target service gNB sends a context response of the remote UE to the CN. In step S1604, the target service gNB sends a data forwarding address indication to the source service gNB of the remote UE, to instruct the source service gNB to forward data of the remote UE to the target service gNB. In step S1605, the target service gNB sends a path switching request of the remote UE to the CN, to request to switch a path of the remote UE to the target service gNB. In step S1606, the CN sends a path switching response to the target service gNB. Therefore, during the sleep state of the relay UE and the remote UE, the target service gNB obtains the context of the remote UE, and the path of the remote UE is switched to the target service gNB. After the remote UE1 wakes up, the remote UE1 is reconnected to the relay UE in step S1607. In step S1608, the remote UE1 sends an RRC connection resume request to the relay UE. In step S1609, the relay UE forwards the RRC connection resume request of the remote UE1 to the target service gNB. In step S1610, the target service gNB sends RRC connection resume information of the remote UE1 to the relay UE. In step S1611, the relay UE forwards the RRC connection resume information of the remote UE1 to the remote UE1. In step S1612, the target service gNB sends context release information of the remote UE1 to the source service gNB of the remote UE1, to request to release a context of the remote UE1. In step S1613, the source service gNB releases the context of the remote UE1. Therefore, the remote UE can be switch to the target service gNB quickly after waking up.

As mentioned earlier with reference to FIG. 3, in a case that the serving base station of the relay UE is changed, the remote UE cannot perform the switching process because the remote UE is in the sleep state. According to embodiments of the present disclosure, as shown in FIG. 12 to FIG. 13, during the active switching by the relay UE, the relay UE can save the switching RRC reconfiguration information for the remote UE in the sleep state, and send the switching RRC reconfiguration information after the remote UE wakes up, so that the remote UE in the sleep state can perform switching after waking up. As shown in FIG. 14, during the passive handover of the relay UE, the remote UE can send, after waking up, the RRC connection resume request including the source service gNB of the remote UE to the relay UE, so that the new service gNB of the relay UE can request for a context of the remote UE from the source service gNB of the remote UE, and switches the path of the remote UE. Hence, the remote UE can perform the switching. In addition, to speed up the switching, as shown in FIG. 15 and FIG. 16, the CN can estimate the target service gNB of the relay UE in advance, so that the target service gNB can obtain the context of the relay UE and the remote UE in advance, and can switch the path of the relay UE and the path of the remote UE in advance. Hence, a time period for the switching is reduced.

Figure 17:
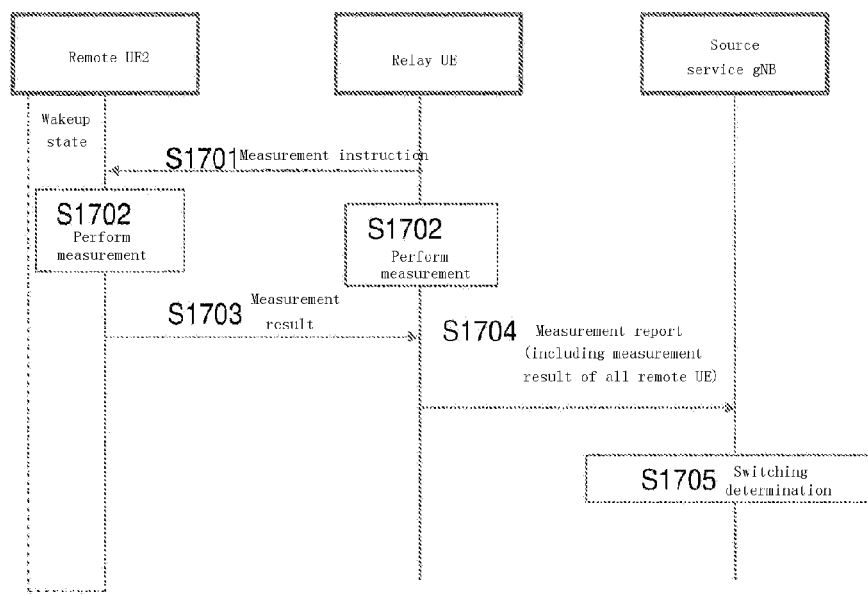
FIG. 17 is a signaling flow of a process of a remote UE having a hybrid connection and a relay UE both performing measurement according to an embodiment of the present disclosure.
Figure 18:
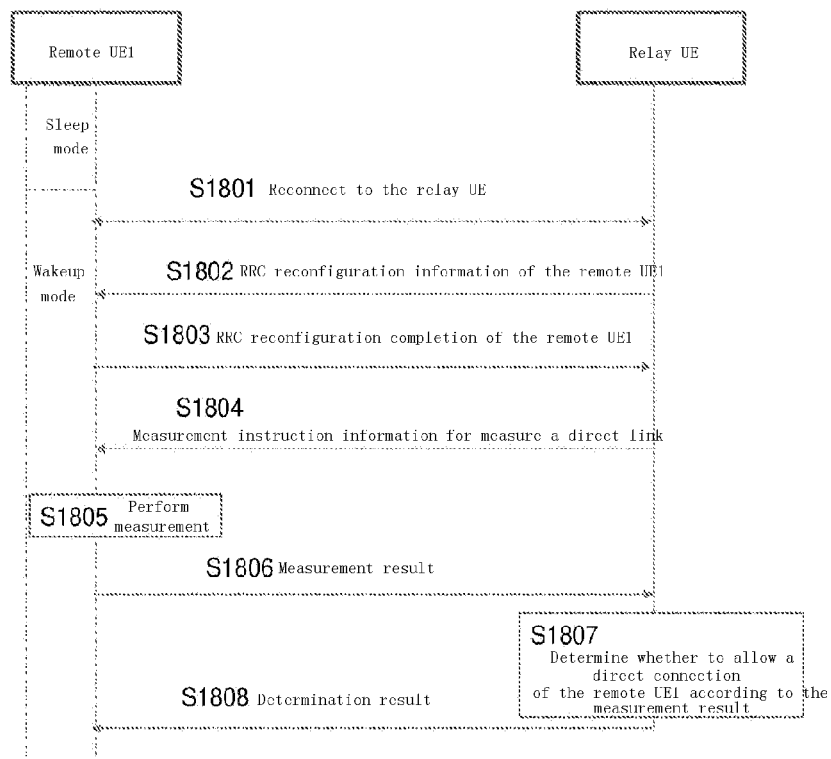
FIG. 18 is a signaling flow of operations after wakeup of a remote UE which has a hybrid connection and performs no measurement due to a sleep state.

A process of cell measurement in a case of presence of a remote UE having a hybrid connection is described below in conjunction with FIG. 17 and FIG. 18. In FIG. 17 and FIG. 18, the remote UE may be implemented by the electronic equipment 700, the relay UE may be implemented by the electronic equipment 600, and the source service gNB may be located on non-transparent satellite equipment, or in a ground station connected with transparent satellite equipment. In addition, it is assumed that each of a remote UE1 and a remote UE2 has a hybrid connection.

FIG. 17 is a signaling flow of a process of a remote UE having a hybrid connection and a relay UE both performing measurement according to an embodiment of the present disclosure. FIG. 17 shows an improvement on the process of generating and sending a measurement report as shown in step S1201 in FIG. 12 and step S1301 in FIG. 13. Reference is made to FIG. 17. In step S1701, since the remote UE2 is in a wakeup state, when measurement for cell switching is required, the relay UE sends a measurement instruction to the remote UE2 to instruct the remote UE2 to perform the measurement for cell switching. In step S1702, the remote UE2 and the relay UE each performs the measurement for cell switching. In step S1703, the remote UE2 sends its measurement result to the relay UE. In step S1704, the relay UE sends a measurement report to the source service gNB. The measurement report includes a measurement result of the remote UE2 and a measurement result of the relay UE. In step S1705, the source service gNB makes a switching decision according to the measurement report.

FIG. 18 is a signaling flowchart showing operations after wakeup of a remote UE which has a hybrid connection and performs no measurement due to a sleep state. FIG. 18 shows an improvement on the process shown in steps S1213 to S1216 in FIG. 12 and steps S1329 to S1332 in FIG. 13. In FIG. 18, when performing measurement for cell switching, the remote UE1 does not perform the measurement for cell switching because the remote UE1 is the sleep state. Reference is made to FIG. 18. After the remote UE1 wakes up, in step S1801, the remote UE1 is reconnected to the relay UE. In step S1802, the relay UE sends RRC reconfiguration information to the remote UE1. In step S1803, the remote UE1 sends RRC reconfiguration completion information to the relay UE. In step S1804, the relay UE sends measurement instruction information to the remote UE1 to instruct the remote UE1 to measure a quality of a direct connection between the remote UE1 and the target service gNB. In step S1805, the remote UE1 executes a measurement process. In step S1806, the remote UE1 sends a measurement result to the relay UE. In step S1807, the relay UE determines whether to allow the direct connection between the remote UE1 and the target service gNB according to the measurement result. In step S1808, the relay UE sends a determination result to the remote UE1.

As mentioned earlier, during a process of selecting the target serving base station, the source serving base station consider only the channel quality between the relay UE and another base station. That is, there is a situation where the channel quality between the remote UE and the target serving base station is poor. In FIG. 4, for a remote UE having a hybrid connection, in a case that the relay UE switches to the target serving base station, the remote UE may not be able to perform uplink or downlink communication if the channel quality between the remote UE and the target serving base station is poor. According to an embodiment of the present disclosure, as shown in FIG. 17, the source service gNB considers a measurement result of the remote UE having a hybrid connection when making handover decision, so that a target service gNB corresponding to both a good measurement result of the remote UE and a good measurement result of the relay UE can be selected. Thereby, the remote UEs having a hybrid connection can communicate well after switching. In addition, as shown in FIG. 18, for a remote UE that has a hybrid connection and is in a sleep state, a direct connection between the remote UE and the target service gNB can be measured after the remote UE wakes up and switches to the target service gNB. In a case that measurement result is not ideal, the service gNB directly connected to the remote UE may be replaced. Thus, the remote UE having a hybrid connection can communicate well after the switching.

4. Method Embodiment

A wireless communication method performed by the electronic equipment 500 for network side in the wireless communication system according to an embodiment of the present disclosure is described in detail below.

Figure 19:
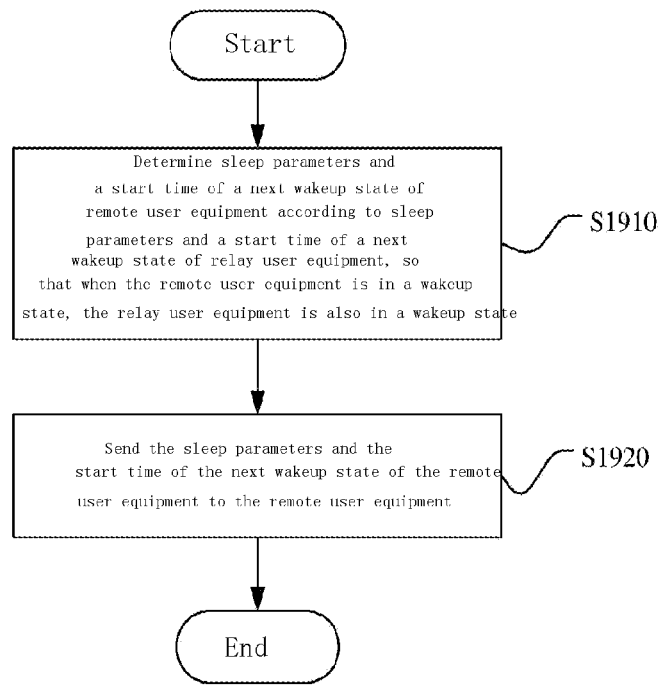
FIG. 19 is a flowchart showing a wireless communication method performed by electronic equipment for the network side according to an embodiment of the present disclosure.

FIG. 19 is a flowchart showing a wireless communication method performed by electronic equipment 500 for network side in a wireless communication system according to an embodiment of the present disclosure.

Reference is made to FIG. 19. In step S1910, sleep parameters and a start time of a next wakeup state of remote user equipment are determined according to sleep parameters and a start time of a next wakeup state of relay user equipment, so that when the remote user equipment is in a wakeup state, the relay user equipment is also in a wakeup state.

Next, in step S1920, the sleep parameters and the start time of the next wakeup state of the remote user equipment are sent to the remote user equipment.

Here, the remote user equipment communicates with satellite equipment via the relay user equipment, and the sleep parameters include a duration of a sleep state and a duration of a wakeup state.

Preferably, the wireless communication method further includes: receiving expected sleep parameters of the remote user equipment from the remote user equipment; and determining the sleep parameters of the remote user equipment further according to the expected sleep parameters of the remote user equipment.

Preferably, the wireless communication method further includes: determining the start time of the next wakeup state of the relay user equipment, so that when the relay user equipment is in a wakeup state, satellite equipment serving the relay user equipment exists.

Preferably, the wireless communication method further includes: receiving expected sleep parameters of the relay user equipment from the relay user equipment; and determining the sleep parameters of the relay user equipment according to the expected sleep parameters of the relay user equipment.

Preferably, the wireless communication method further includes: estimating a target serving base station of the relay user equipment according to the sleep parameters of the relay user equipment; sending context acquisition request including a source serving base station of the relay user equipment to the target serving base station, so that the target serving base station requests a context of the relay user equipment from the source serving base station of the relay user equipment; receiving path switching request information of the relay user equipment from the target serving base station; and switching a path of the relay user equipment to the target serving base station.

Preferably, the wireless communication method further includes: sending context acquisition request information including a source serving base station of the remote user equipment to the target serving base station, so that the target serving base station requests a context of the remote user equipment from the source serving base station of the remote user equipment; receiving path switching request information of the remote user equipment from the target serving base station; and switching a path of the remote user equipment to the target serving base station.

According to the embodiments of the present disclosure, a subject of the method may be the electronic equipment 500 according to the embodiments of the present disclosure. Therefore, all embodiments of the electronic equipment 500 described before are applicable thereto.

A wireless communication method performed by electronic equipment 600 for relay user equipment in a wireless communication system according to an embodiment of the present disclosure is described in detail below.

Figure 20:
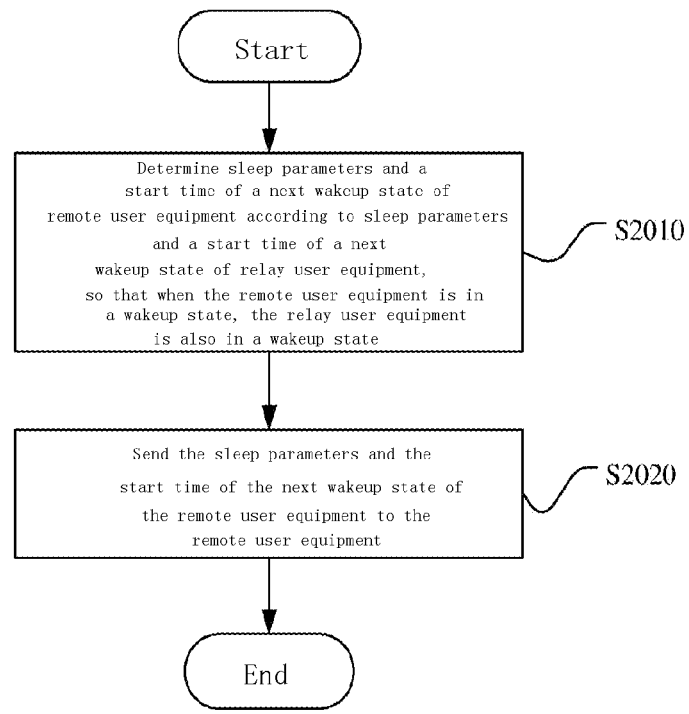
FIG. 20 is a flowchart showing a wireless communication method performed by electronic equipment for a relay UE according to an embodiment of the present disclosure.

FIG. 20 is a flowchart showing a wireless communication method performed by electronic equipment 600 for relay user equipment in a wireless communication system according to an embodiment of the present disclosure.

Reference is made to FIG. 20. In step S2010, sleep parameters and a start time of a next wakeup state of remote user equipment are determined according to sleep parameters and a start time of a next wakeup state of relay user equipment, so that when the remote user equipment is in a wakeup state, the relay user equipment is also in a wakeup state.

Next, in step S2020, the sleep parameters and the start time of the next wakeup state of the remote user equipment are sent to the remote user equipment.

Here, the remote user equipment communicates with satellite equipment via the relay user equipment, and the sleep parameters include a duration of a sleep state and a duration of a wakeup state.

Preferably, the wireless communication method further includes: receiving expected sleep parameters of the remote user equipment from the remote user equipment; and determining the sleep parameters of the remote user equipment further according to the expected sleep parameters of the remote user equipment.

Preferably, the wireless communication method further includes: determining the start time of the next wakeup state of the relay user equipment, so that when the relay user equipment is in a wakeup state, satellite equipment serving the relay user equipment exists.

Preferably, the wireless communication method further includes: receiving switching RRC reconfiguration information from the source serving base station of the electronic equipment; determining whether each remote user equipment served by the electronic equipment is in a sleep state or a wakeup state; sending the switching RRC reconfiguration information to remote user equipment in the wakeup state; and saving switching RRC reconfiguration information of remote user equipment in the sleep state.

Preferably, the wireless communication method further includes: sending, after remote user equipment in the sleep state wakes up, the switching RRC reconfiguration information to the remote user equipment.

Preferably, the wireless communication method further includes: receiving RRC connection resume request information from the remote user equipment, where the RRC connection resume request information includes a source serving base station of the remote user equipment; sending the RRC connection resume request information to a serving base station of electronic equipment, so that the serving base station of the electronic equipment requests for a context of the remote user equipment from the source serving base station of the remote user equipment; receiving RRC connection resume information of remote user equipment from the serving base station of the electronic equipment; and sending the RRC connection resume information to the remote user equipment.

Preferably, the wireless communication method further includes: sending measurement instruction information to remote user equipment that is in a wakeup state, has a hybrid connection, and is serviced by the electronic equipment, to instruct the remote user equipment to perform a switching measurement; performing the switching measurement; and sending a measurement result to the serving base station. The measurement result includes a measurement result of the electronic equipment and a measurement result of the remote user equipment. The remote user equipment having a hybrid connection performs one of uplink communication and downlink communication with satellite equipment through the electronic equipment, and directly performs the other one of the uplink communication and the downlink communication with the satellite equipment.

Preferably, the wireless communication method also includes sending measurement instruction information to the remote user equipment, to instruct the remote user equipment to measure a channel quality between the remote user equipment and the satellite equipment, when the remote user equipment that is in a sleep state, has a hybrid connection, and is served by the electronic equipment wakes up.

According to an embodiment of the present disclosure, a subject of the above method may be the electronic equipment 600 according to the embodiments of the present disclosure. Therefore, all the embodiments of the electronic equipment 600 described before are applicable thereto.

A wireless communication method performed by electronic equipment 700 for remote user equipment in a wireless communication system according to an embodiment of the present disclosure is described in detail below.

Figure 21:
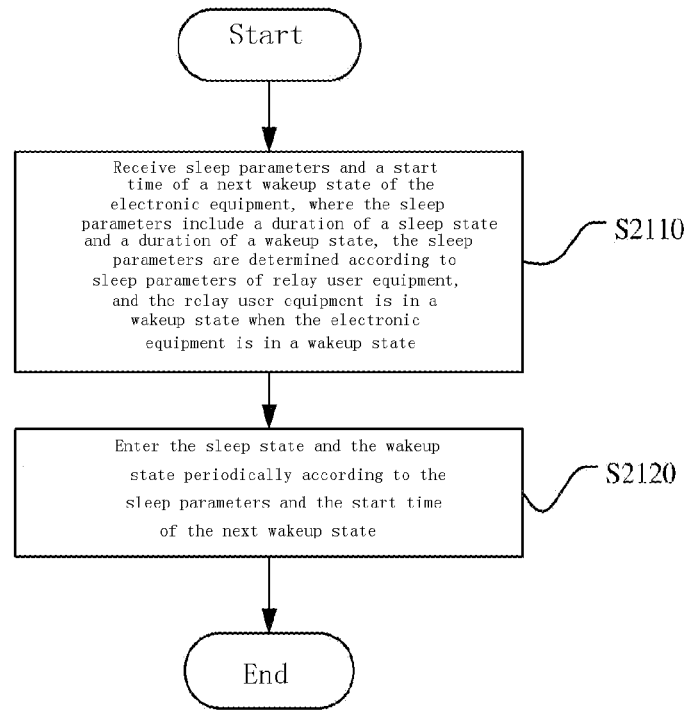
FIG. 21 is a flowchart showing a wireless communication method performed by electronic equipment for a remote UE according to an embodiment of the present disclosure.

FIG. 21 is a flowchart showing a wireless communication method performed by electronic equipment 700 for remote user equipment in a wireless communication system according to an embodiment of the present disclosure.

Reference is made to FIG. 21. In step S2110, sleep parameters and a start time of a next wakeup state electronic equipment are received, where the sleep parameters include a duration of a sleep state and a duration of a wakeup state, the sleep parameters are determined according to sleep parameters of the relay user equipment, and the relay user equipment is in a wakeup state when the electronic equipment is in a wakeup state.

Next, in step S2120, the sleep state and the wakeup state are entered periodically according to the sleep parameters and the start time of the next wakeup state.

Here, the electronic equipment communicates with satellite equipment via the relay user equipment.

Preferably, the wireless communication method further includes: sending expected sleep parameters of the electronic equipment. The sleep parameters of the electronic equipment are determined further according to the expected sleep parameters of the electronic equipment.

Preferably, the wireless communication method further includes: reconnecting to the relay user equipment when the electronic equipment wakes up; receiving switching RRC reconfiguration information from the relay user equipment; and sending switching RRC reconfiguration completion information to the relay user equipment, to communicate with a new serving base station through the relay user equipment.

Preferably, the wireless communication method further includes: reconnecting to the relay user equipment when the electronic equipment wakes up; sending RRC connection resume request information to the relay user equipment, wherein the RRC connection resume request information includes a source serving base station of the electronic equipment; and receiving RRC connection resume information from the relay user equipment, to communicate with a new serving base station through the relay user equipment.

According to the embodiment of the present disclosure, a subject of the above method may be the electronic equipment 700 according to the embodiments of the present disclosure. Therefore, all the embodiments of the electronic equipment 700 described before are applicable thereto.

5. Application Example

The technology of the present disclosure is applicable to various products.

For example, the electronic device 500 may be implemented as any type of server, such as a tower server, a rack server, and a blade server. The electronic device 500 may be a control module installed on a server (such as an integrated circuit module including a single wafer, and a card or blade inserted into a slot of a blade server).

The base station equipment may be implemented as a macro eNB or a small eNB, or may be implemented as a gNB (a base station in a 5G system) in any type. The small eNB may be an eNB covering a cell smaller than a macro cell, such as a pico eNB, a micro eNB, or a home (femto) eNB. Alternatively, the base station may be implemented as any other type of base station, such as a NodeB or a base transceiver station (BTS). The base station may include a body (which is also referred to as base station equipment) configured to control wireless communication and one or more remote radio heads (RRHs) that are arranged in a different place from the body.

Each of the relay user equipment and the remote user equipment may be implemented as a mobile terminal (such as a smartphone, a tablet personal computer (PC), a notebook PC, a portable game terminal, a portable/dongle-type mobile router, and a digital camera), or an in-vehicle terminal (such as a car navigation device). The user equipment may also be implemented as a terminal that performs machine-to-machine (M2M) communication (which is also referred to as a machine type communication (MTC) terminal). In addition, the user equipment may be a wireless communication module (such as an integrated circuit module including a single wafer) installed on each of the user equipment described above.

<Application Examples of a Server>

Figure 22:
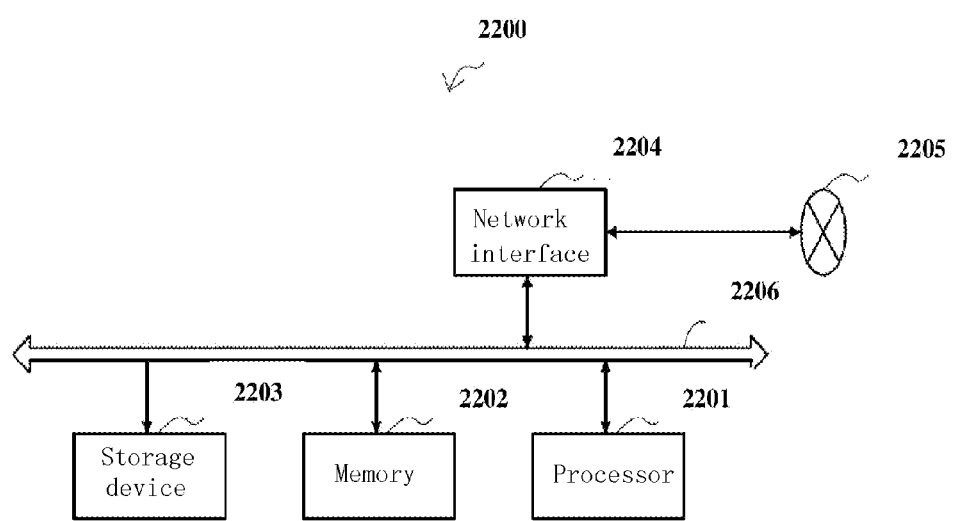
FIG. 22 is a block diagram showing an example of a server that can implement the electronic equipment according to the embodiments of the present disclosure.

FIG. 22 is a block diagram of an example of a server 2200 which can implement the electronic equipment 500 according to the present disclosure. The server 2200 includes a processor 2201, a memory 2202, a storage device 2203, a network interface 2204, and a bus 2206.

The processor 2201 may be, for example, a central processing unit (CPU) or a digital signal processor (DSP), and controls functions of the server 2200. The memory 2202 includes a random access memory (RAM) and a read-only memory (ROM), and stores data and a program executed by the processor 2201. The storage device 2203 may include a storage medium, such as a semiconductor memory and a hard disk.

The network interface 2204 is a wired communication interface for connecting the server 2200 to a wired communication network 2205. The wired communication network 2205 may be a core network such as an Evolved Packet Core (EPC), or a packet data network (PDN) such as the Internet.

The bus 2206 connects the processor 2201, the memory 2202, the storage device 2203, and the network interface 2204 to each other. The bus 2206 may include two or more buses having different speeds (such as a high-speed bus and a low-speed bus).

In the server 2200 shown in FIG. 22, the determination unit 510, the determination unit 530, the estimation unit 540, the generating unit 550, and the switching unit 560 described with reference to FIG. 5 may be implemented by the processor 2201, and the communication unit 520 described with reference to FIG. 5 may be implemented by the network interface 2204. For example, the processor 2201 may perform functions of determining sleep parameters and a start time of a next wakeup state of remote user equipment, determining sleep parameters and a start time of a next wakeup state of relay user equipment of the sleep mode, estimating a target serving base station of the relay user equipment, generating context retrieve information, switching a path by executing instructions stored in the memory 2202 or the storage device 2203.

Application Examples of a Base Station

First Application Example

Figure 23:
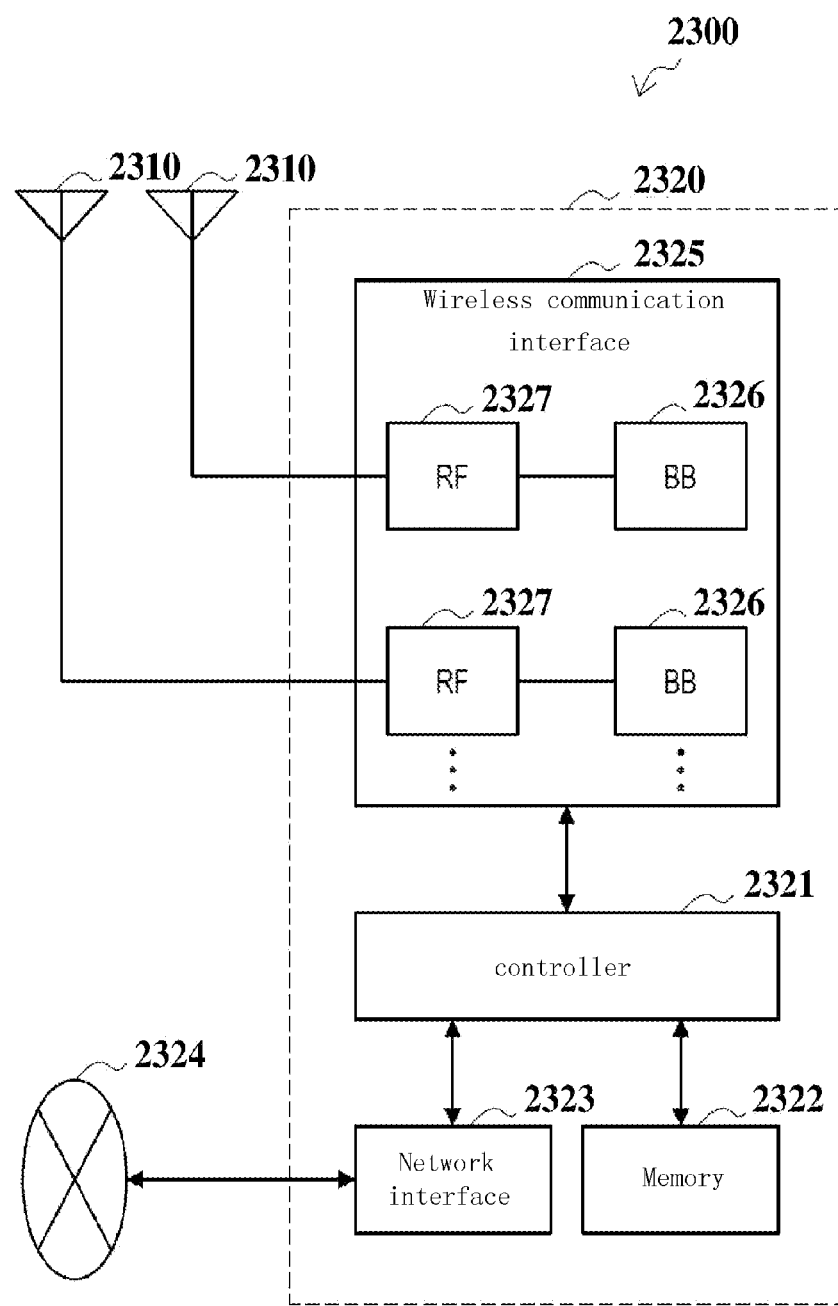
FIG. 23 is a block diagram showing a first example of a schematic configuration of an Evolved Node B (eNB)

FIG. 23 is a block diagram showing a first example of a schematic configuration of an eNB to which the technology of the present disclosure may be applied. The eNB 2300 includes a single or multiple antennas 2310 and base station equipment 2320. The base station equipment 2320 and each of the antennas 2310 may be connected to each other via a RF cable.

Each of the antennas 2310 includes a single or multiple antenna elements (such as multiple antenna elements included in a multiple-input multiple-output (MIMO) antenna), and are used for transmitting and receiving wireless signals by the base station equipment 2320. The eNB 2300 may include multiple antennas 2310, as shown in FIG. 23. For example, the multiple antennas 2310 may be compatible with multiple frequency bands used by the eNB 2300. Although FIG. 23 shows an example in which the eNB 2300 includes multiple antennas 2310, the eNB 2300 may include a single antenna 2310.

The base station equipment 2320 includes a controller 2321, a memory 2322, a network interface 2323, and a wireless communication interface 2325.

The controller 2321 may be, for example, a CPU or a DSP, and operates various high-level functions of the base station equipment 2320. For example, the controller 2321 generates a data packet according to data in a signal processed by the wireless communication interface 2325, and transfers the generated packet via the network interface 2323. The controller 2321 may bundle data from multiple baseband processors to generate a bundled packet, and transfer the generated bundled packet. The controller 2321 may have logical functions of performing control such as radio resource control, radio bearer control, mobility management, admission control, and scheduling. The control may be performed in conjunction with an adjacent eNB or a core network node. The memory 2322 includes a RAM and a ROM, and stores a program executed by the controller 2321, and various types of control data (such as a terminal list, transmission power data, and scheduling data).

The network interface 2323 is a communication interface for connecting the base station equipment 2320 to a core network 2324. The controller 2321 may communicate with a core network node or another eNB via the network interface 2323. In this case, the eNB 2300, and the core network node or the other eNB may be connected to each other through a logical interface (such as an S1 interface and an X2 interface). The network interface 2323 may be a wired communication interface or a wireless communication interface for a wireless backhaul line. In a case that the network interface 2323 is a wireless communication interface, the network interface 2323 may use a higher frequency band for wireless communication than a frequency band used by the wireless communication interface 2325.

The wireless communication interface 2325 supports any cellular communication scheme (such as Long Term Evolution (LTE) and LTE-Advanced), and provides wireless connection to a terminal positioned in a cell of the eNB 2300 via the antenna 2310. The wireless communication interface 2325 may typically include, for example, a baseband (BB) processor 2326 and an RF circuit 2327. The BB processor 2326 may perform, for example, coding/decoding, modulation/demodulation and multiplexing/de-multiplexing, and perform various types of signal processes of layers (for example, L1, media access control (MAC), radio link control (RLC) and packet data convergence protocol (PDCP)). Instead of the controller 2321, the BB processor 2326 may have a part or all of the above logical functions. The BB processor 2326 may be a memory storing a communication control program, or a module including a processor and a related circuit configured to execute the program. Updating the program may change the functions of the BB processor 2326. The module may be a card or a blade inserted into a slot of the base station equipment 2320. Alternatively, the module may be a chip mounted on the card or the blade. In addition, the RF circuit 2327 may include, for example, a frequency mixer, a filter or an amplifier, and transmits and receives wireless signals via the antenna 2310.

As shown in FIG. 23, the wireless communication interface 2325 may include multiple BB processors 2326. For example, the multiple BB processors 2326 may be compatible with multiple frequency bands used by the eNB 2300. As shown in FIG. 23, the wireless communication interface 2325 may include multiple RF circuits 2327. For example, the multiple RF circuits 2327 may be compatible with multiple antenna elements. Although FIG. 23 shows an example in which the wireless communication interface 2325 includes multiple BB processors 2326 and multiple RF circuits 2327, the wireless communication interface 2325 may include a single BB processor 2326 or a single RF circuit 2327.

Second Application Example

Figure 24:
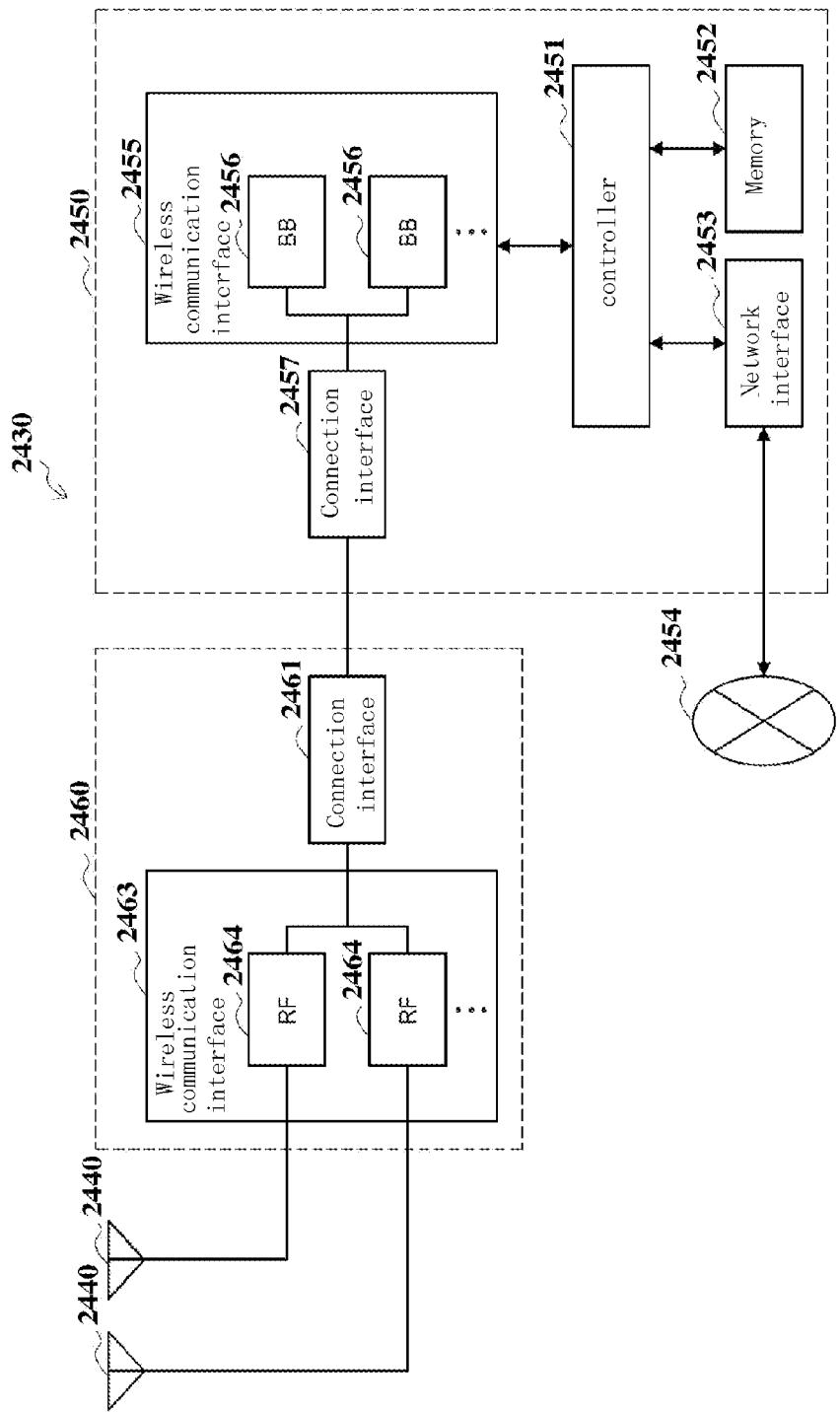
FIG. 24 is a block diagram showing a second example of a schematic configuration of an eNB.

FIG. 24 is a block diagram showing a second example of a schematic configuration of an eNB to which the technology of the present disclosure may be applied. An eNB 2430 includes a single or multiple antennas 2440, base station equipment 2450 and an RRH 2460. The RRH 2460 and the antennas 2440 may be connected to each other via an RF cable. The base station equipment 2450 and the RRH 2460 may be connected to each other via a high-speed line such as an optical fiber cable.

Each of the antennas 2440 includes a single or multiple antennal elements (such as multiple antenna elements included in a multiple-input multiple-output (MIMO) antenna), and is used for the RRH 2460 to transmit and receive wireless signals. As shown in FIG. 24, the eNB 2430 may include multiple antennas 2440. For example, the multiple antennas 2440 may be compatible with multiple frequency bands used by the eNB 2430. Although FIG. 24 shows an example in which the eNB 2430 includes multiple antennas 2440, the eNB 2430 may include a single antenna 2440.

The base station equipment 2450 includes a controller 2451, a memory 2452, a network interface 2453, a wireless communication interface 2455, and a connection interface 2457. The controller 2451, the memory 2452, and the network interface 2453 are the same as the controller 2321, the memory 2322, and the network interface 2323 described with reference to FIG. 23.

The wireless communication interface 2455 supports any cellular communication scheme (such as LTE and LTE-advanced), and provides wireless communication with a terminal located in a sector corresponding to the RRH 2460 via the RRH 2460 and the antenna 2440. The wireless communication interface 2455 may typically include, for example, a BB processor 2456. The BB processor 2456 is the same as the BB processor 2326 described with reference to FIG. 23, except that the BB processor 2456 is connected to an RF circuit 2464 of the RRH 2460 via the connection interface 2457. As show in FIG. 24, the wireless communication interface 2455 may include multiple BB processors 2456. For example, the multiple BB processors 2456 may be compatible with the multiple frequency bands used by the eNB 2430. Although FIG. 24 shows an example in which the wireless communication interface 2455 includes multiple BB processors 2456, the wireless communication interface 2455 may include a single BB processor 2456.

The connection interface 2457 is an interface for connecting the base station equipment 2450 (the wireless communication interface 2455) to the RRH 2460. The connection interface 2457 may be a communication module for communication in the above-described high speed line that connects the base station equipment 2450 (the wireless communication interface 2455) to the RRH 2460.

The RRH 2460 includes a connection interface 2461 and a wireless communication interface 2463.

The connection interface 2461 is an interface for connecting the RRH 2460 (the wireless communication interface 2463) to the base station equipment 2450. The connection interface 2461 may also be a communication module for communication in the above high-speed line.

The wireless communication interface 2463 transmits and receives wireless signals via the antenna 2440. The wireless communication interface 2463 may typically include, for example, the RF circuit 2464. The RF circuit 2464 may include, for example, a frequency mixer, a filter and an amplifier, and transmits and receives wireless signals via the antenna 2440. The wireless communication interface 2463 may include multiple RF circuits 2464, as shown in FIG. 24. For example, the multiple RF circuits 2464 may support multiple antenna elements. Although FIG. 24 shows the example in which the wireless communication interface 2463 includes multiple RF circuits 2464, the wireless communication interface 2463 may include a single RF circuit 2464.

Application Examples of a Terminal Device

First Application Example

Figure 25:
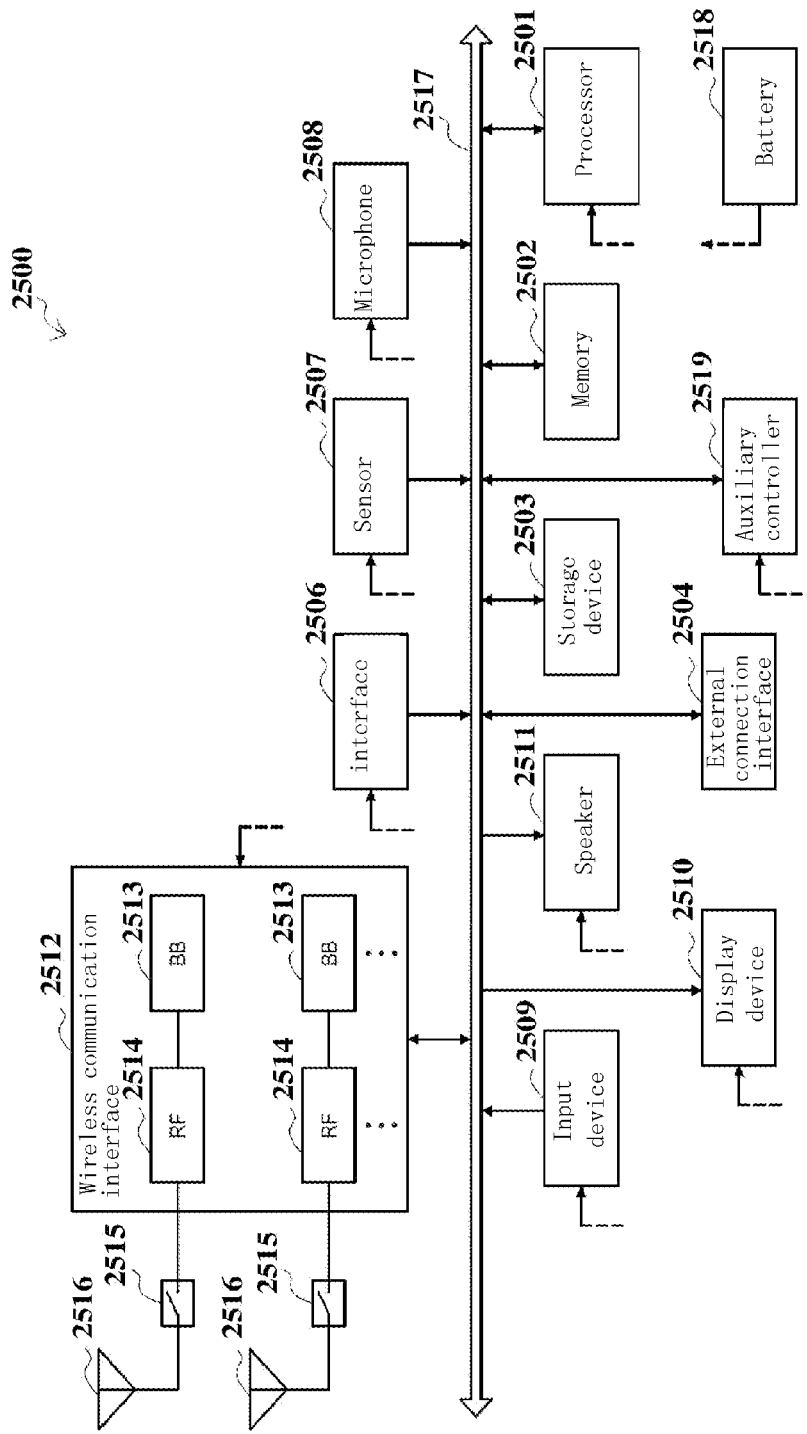
FIG. 25 is a block diagram showing an example of a schematic configuration of a smartphone.

FIG. 25 is a block diagram showing an example of a schematic configuration of a smartphone 2500 to which the technology according to the present disclosure may be applied. The smartphone 2500 includes a processor 2501, a memory 2502, a storage device 2503, an external connection interface 2504, a camera 2506, a sensor 2507, a microphone 2508, an input device 2509, a display device 2510, a speaker 2511, a wireless communication interface 2512, one or more antenna switches 2515, one or more antennas 2516, a bus 2517, a battery 2518, and an auxiliary controller 2519.

The processor 2501 may be, for example, a CPU or a system on a chip (SoC), and controls functions of an application layer and another layer of the smartphone 2500. The memory 2502 includes a RAM and a ROM, and stores a program executed by the processor 2501 and data. The storage 2503 may include a storage medium such as a semiconductor memory and a hard disk. The external connection interface 2504 is an interface for connecting an external device (such as a memory card and a universal serial bus (USB) device) to the smartphone 2500.

The camera 2506 includes an image sensor (such as a charge coupled device (CCD) and a complementary metal oxide semiconductor (CMOS)), and generates a captured image. The sensor 2507 may include a group of sensors, such as a measurement sensor, a gyro sensor, a geomagnetism sensor, and an acceleration sensor. The microphone 2508 converts sounds inputted to the smartphone 2500 to audio signals. The input device 2509 includes, for example, a touch sensor configured to detect touch onto a screen of the display device 2510, a keypad, a keyboard, a button, or a switch, and receives an operation or information inputted from a user. The display device 2510 includes a screen (such as a liquid crystal display (LCD) and an organic light-emitting diode (OLED) display), and displays an output image of the smartphone 2500. The speaker 2511 converts audio signals outputted from the smartphone 2500 to sounds.

The wireless communication interface 2512 supports any cellular communication scheme (such as LTE and LTE-advanced), and performs wireless communication. The wireless communication interface 2512 may include, for example, a BB processor 2513 and an RF circuit 2514. The BB processor 2513 may perform, for example, encoding/decoding, modulating/demodulating, and multiplexing/demultiplexing, and perform various types of signal processing for wireless communication. The RF circuit 2514 may include, for example, a mixer, a filter and an amplifier, and transmits and receives wireless signals via the antenna 2516. The wireless communication interface 2512 may be a chip module having the BB processor 2513 and the RF circuit 2514 integrated thereon. The wireless communication interface 2512 may include multiple BB processors 2513 and multiple RF circuits 2514, as shown in FIG. 25. Although FIG. 25 shows the example in which the wireless communication interface 2512 includes multiple BB processors 2513 and multiple RF circuits 2514, the wireless communication interface 2512 may include a single BB processor 2513 or a single RF circuit 2514.

Furthermore, in addition to a cellular communication scheme, the wireless communication interface 2512 may support another type of wireless communication scheme such as a short-distance wireless communication scheme, a near field communication scheme, and a wireless local area network (LAN) scheme. In this case, the wireless communication interface 2512 may include the BB processor 2513 and the RF circuit 2514 for each wireless communication scheme.

Each of the antenna switches 2515 switches connection destinations of the antennas 2516 among multiple circuits (such as circuits for different wireless communication schemes) included in the wireless communication interface 2512.

Each of the antennas 2516 includes a single or multiple antenna elements (such as multiple antenna elements included in an MIMO antenna) and is used for the wireless communication interface 2512 to transmit and receive wireless signals. The smartphone 2500 may include the multiple antennas 2516, as shown in FIG. 25. Although FIG. 25 shows the example in which the smartphone 2500 includes multiple antennas 2516, the smartphone 2500 may include a single antenna 2516.

Furthermore, the smartphone 2500 may include the antenna 2516 for each wireless communication scheme. In this case, the antenna switches 2515 may be omitted from the configuration of the smartphone 2500.

The bus 2517 connects the processor 2501, the memory 2502, the storage device 2503, the external connection interface 2504, the camera 2506, the sensor 2507, the microphone 2508, the input device 2509, the display device 2510, the speaker 2511, the wireless communication interface 2512, and the auxiliary controller 2519 to each other. The battery 2518 supplies power to blocks of the smartphone 2500 shown in FIG. 25 via feeder lines, which are partially shown as dashed lines in FIG. 25. The auxiliary controller 2519 operates a minimum necessary function of the smartphone 2500, for example, in a sleep mode.

In the smartphone 2500 shown in FIG. 25, the determination unit 610, the determination unit 630, the state determination unit 640, the generating unit 660, the measurement unit 670, the generating unit 680 described with reference to FIG. 6, and the sleep control unit 720, the generating unit 730, the connecting unit 740, the determination unit 750, the measurement unit 760, and the generating unit 770 described with reference to FIG. 7 may be implemented by the processor 2501 or the auxiliary controller 2519. At least a part of the functions may be implemented by the processor 2501 or the auxiliary controller 2519. For example, the processor 2501 or the auxiliary controller 2519 may perform the functions of determining sleep parameters and a start time of a next wakeup state of remote user equipment, determining a start time of a next wakeup state of relay user equipment, determining a state of the remote user equipment, generating a measurement report, performing measurement for cell switching, generating measurement instruction information, controlling a sleep mode of the remote user equipment, generating expected sleep parameters, connecting to the relay user equipment, determining whether the relay user equipment performs active switching or passive switching, performing the measurement for cell switching, and generating a measurement report by executing instructions stored on the memory 2502 or the storage device 2503.

Second Application Example

Figure 26:
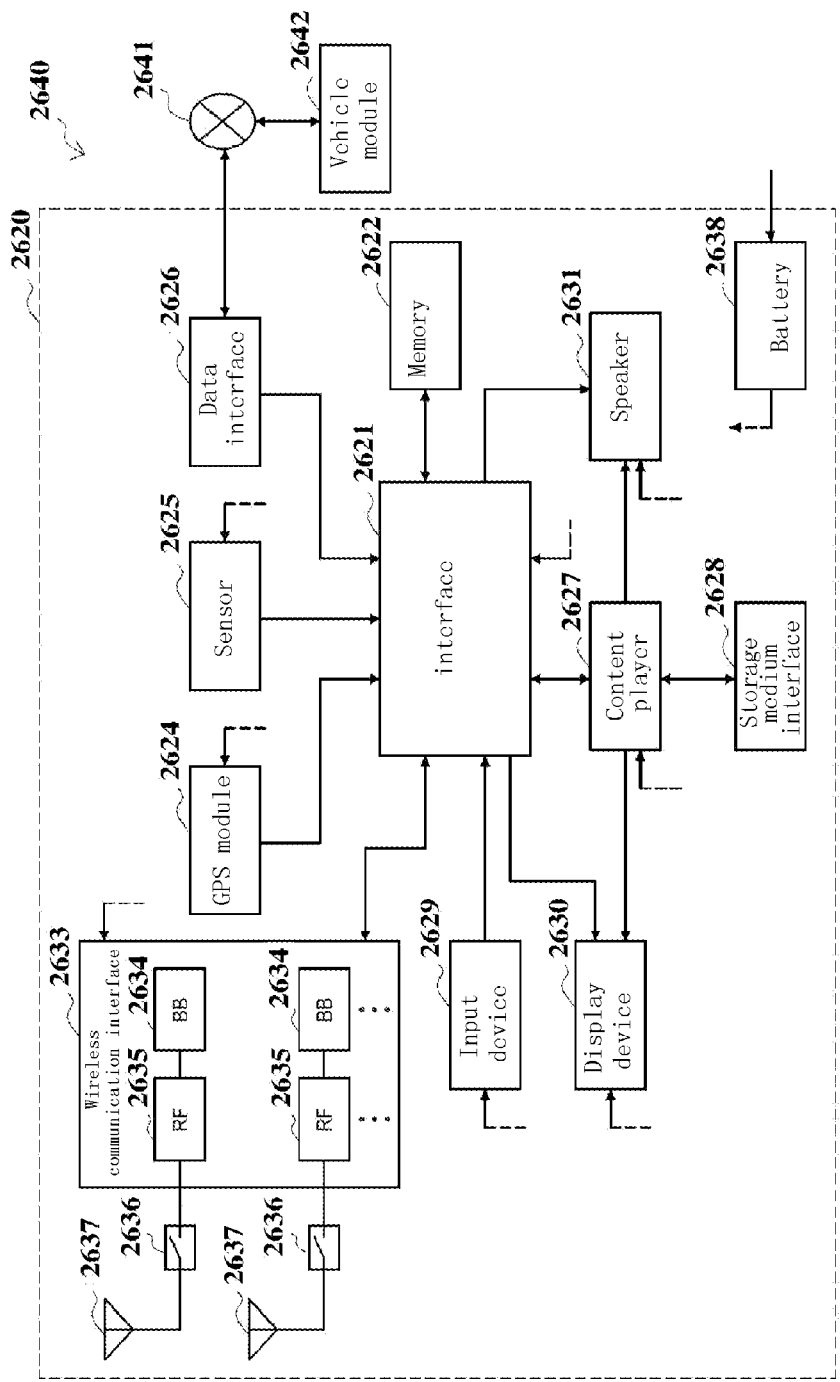
FIG. 26 is a block diagram showing an example of a schematic configuration of a car navigation device.

FIG. 26 is a block diagram showing an example of a schematic configuration of a navigation apparatus 2620 to which the technology according to the present disclosure may be applied. The navigation apparatus 2620 includes a processor 2621, a memory 2622, a global positioning system (GPS) module 2624, a sensor 2625, a data interface 2626, a content player 2627, a storage medium interface 2628, an input device 2629, a display device 2630, a speaker 2631, a wireless communication interface 2633, one or more antenna switches 2636, one or more antennas 2637, and a battery 2638.

The processor 2621 may be, for example a CPU or a SoC, and controls a navigation function and additional function of the navigation apparatus 2620. The memory 2622 includes RAM and ROM, and stores a program executed by the processor 2621, and data.

The GPS module 2624 determines a position (such as latitude, longitude and altitude) of the navigation apparatus 2620 by using GPS signals received from a GPS satellite. The sensor 2625 may include a group of sensors such as a gyro sensor, a geomagnetic sensor and an air pressure sensor. The data interface 2626 is connected to, for example, an in-vehicle network 2641 via a terminal that is not shown, and acquires data (such as vehicle speed data) generated by the vehicle.

The content player 2627 reproduces content stored in a storage medium (such as a CD and DVD) that is inserted into the storage medium interface 2628. The input device 2629 includes, for example, a touch sensor configured to detect touch on a screen of the display device 2630, a button, or a switch, and receives an operation or information inputted from a user. The display device 2630 includes a screen such as an LCD or OLED display, and displays an image of the navigation function or reproduced content. The speaker 2631 outputs a sound for the navigation function or the reproduced content.

The wireless communication interface 2633 supports any cellular communication scheme (such as LTE and LTE-Advanced), and performs wireless communication. The wireless communication interface 2633 may typically include, for example, a BB processor 2634 and an RF circuit 2635. The BB processor 2634 may perform, for example, encoding/decoding, modulating/demodulating, and multiplexing/demultiplexing, and perform various types of signal processing for wireless communication. The RF circuit 2635 may include, for example, a mixer, a filter and an amplifier, and transmits and receives wireless signals via the antenna 2637. The wireless communication interface 2633 may also be a chip module having the BB processor 2634 and the RF circuit 2635 integrated thereon. As shown in FIG. 26, the wireless communication interface 2633 may include multiple BB processors 2634 and multiple RF circuits 2635. Although FIG. 26 shows the example in which the wireless communication interface 2633 includes multiple BB processors 2634 and multiple RF circuits 2635, the wireless communication interface 2633 may include a single BB processor 2634 and a single RF circuit 2635.

Furthermore, in addition to a cellular communication scheme, the wireless communication interface 2633 may support another type of wireless communication scheme such as a short-distance wireless communication scheme, a near field communication scheme, and a wireless LAN scheme. In this case, the wireless communication interface 2633 may include the BB processor 2634 and the RF circuit 2635 for each wireless communication scheme.

Each of the antenna switches 2636 switches connection destinations of the antennas 2637 among multiple circuits (such as circuits for different wireless communication schemes) included in the wireless communication interface 2633.

Each of the antennas 2637 includes a single or multiple antenna elements (such as multiple antenna elements included in an MIMO antenna), and is used for the wireless communication interface 2633 to transmit and receive wireless signals. As shown in FIG. 26, the car navigation apparatus 2620 may include multiple antennas 2637. Although FIG. 26 shows the example in which the car navigation apparatus 2620 includes multiple antennas 2637, the car navigation apparatus 2620 may include a single antenna 2637.

Furthermore, the car navigation apparatus 2620 may include the antenna 2637 for each wireless communication scheme. In this case, the antenna switches 2636 may be omitted from the configuration of the navigation apparatus 2620.

The battery 2638 supplies power to the blocks of the car navigation apparatus 2620 shown in FIG. 26 via feeder lines that are partially shown as dash lines in FIG. 26. The battery 2638 accumulates power supplied from the vehicle.

In the car navigation apparatus 2620 shown in FIG. 26, the determination unit 610, the determination unit 630, the state determination unit 640, the generating unit 660, the measurement unit 670, the generating unit 680 described with reference to FIG. 6, and the sleep control unit 720, the generating unit 730, the connecting unit 740, the determination unit 750, the measurement unit 760, and the generating unit 770 described with reference to FIG. 7 may be implemented by the processor 2621. At least a part of the functions may be implemented by the processor 2621. For example, the processor 2621 may perform the functions of determining sleep parameters and a start time of a next wakeup state of remote user equipment, determining a start time of a next wakeup state of relay user equipment, determining a state of the remote user equipment, generating a measurement report, performing measurement for cell switching, generating measurement instruction information, controlling a sleep mode of the remote user equipment, generating expected sleep parameters, connecting to the relay user equipment, determining whether the relay user equipment performs active switching or passive switching, performing the measurement for cell switching, and generating a measurement report by executing instructions stored on the memory 2622.

The technical solution of the present disclosure may be implemented as an in-vehicle system (or vehicle) 2640 including the car navigation apparatus 2620, the in-vehicle network 2641, and one or more blocks of a vehicle module 2642. The vehicle module 2642 generates vehicle data such as vehicle speed, engine speed, and fault information, and outputs the generated data to the in-vehicle network 2641.

The preferred embodiments of the present disclosure are described above with reference to the drawings, but the present disclosure is not limited to the above examples. Various alternations and modifications may be obtained by those skilled in the art within the scope of the claims, and it should be understood that these alternations and modifications shall naturally fall within the technical scope of the present disclosure.

For example, a unit shown by a dashed box in the functional block diagram shown in the drawings indicates that the functional unit is optional in the corresponding device, and the optional functional units may be combined in an appropriate manner to achieve a expected function.

For example, multiple functions included in one unit in the above embodiments may be implemented by separate devices. Alternatively, multiple functions implemented by multiple units in the above embodiments may be implemented by separate devices, respectively. In addition, one of the above functions may be implemented by multiple units. Apparently, such configurations are within the technical scope of the present disclosure.

In this specification, the steps described in the flowchart include not only processes performed in time series as the order described, but also processes performed in parallel or individually instead of having to be performed in time series. Further, even in the steps processed in time series, the order can be appropriately changed.

Although the embodiments of the present disclosure have been described above in detail in connection with the drawings, it is appreciated that the embodiments described above are merely illustrative rather than limitative for the present disclosure. Those skilled in the art can make various modifications and variations to the above embodiments without departing from the spirit and scope of the present disclosure. Therefore, the scope of the present disclosure is defined merely by the appended claims and equivalents thereof.

The invention claimed is:

1. Electronic equipment, comprising:
a memory;
a radio interface; and
processing circuitry configured to:
   determine sleep parameters and a start time of a next wakeup state of remote user equipment according to sleep parameters and a start time of a next wakeup state of relay user equipment, so that when the remote user equipment is in a wakeup state, the relay user equipment is also in a wakeup state;
   send the sleep parameters and the start time of the next wakeup state of the remote user equipment to the remote user equipment;
   estimate a target serving base station of the relay user equipment according to the sleep parameters of the relay user equipment;
   send context retrieve request information including a source serving base station of the relay user equipment to the target serving base station, so that the target serving base station requests a context of the relay user equipment from the source serving base station of the relay user equipment;

receive path switching request information of the relay user equipment from the target serving base station; and switch a path of the relay user equipment to the target serving base station, wherein the electronic equipment is located in a core network, the remote user equipment communicates with satellite equipment via the relay user equipment, and the sleep parameters include a duration of a sleep state and a duration of a wakeup state.

2. The electronic equipment according to claim 1, wherein the processing circuitry is further configured to:

receive expected sleep parameters of the remote user equipment from the remote user equipment; and determine the sleep parameters of the remote user equipment further according to the expected sleep parameters of the remote user equipment.

3. The electronic equipment according to claim 1, wherein the processing circuitry is further configured to:

determine the start time of the next wakeup state of the relay user equipment, so that when the relay user equipment is in a wakeup state, satellite equipment serving the relay user equipment exists.

4. The electronic equipment according to claim 1, wherein the processing circuitry is further configured to:

receive expected sleep parameters of the relay user equipment from the relay user equipment; and determine the sleep parameters of the relay user equipment according to the expected sleep parameters of the relay user equipment.

5. The electronic equipment according to claim 1, wherein the processing circuitry is further configured to:

send context retrieve request information including a source serving base station of the remote user equipment to the target serving base station, so that the target serving base station requests a context of the remote user equipment from the source serving base station of the remote user equipment;

receive path switching request information of the remote user equipment from the target serving base station; and switch a path of the remote user equipment to the target serving base station.

6. Electronic equipment comprising:

a memory;

a radio interface; and processing circuitry configured to:

determine sleep parameters and a start time of a next wakeup state of remote user equipment according to sleep parameters and a start time of a next wakeup state of relay user equipment, so that when the remote user equipment is in a wakeup state, the relay user equipment is also in a wakeup state;

send the sleep parameters and the start time of the next wakeup state of the remote user equipment to the remote user equipment;

receive switching RRC reconfiguration information from a source serving base station of the electronic equipment;

determine whether each remote user equipment served by the electronic equipment is in a sleep state or a wakeup state;

send the switching RRC reconfiguration information to remote user equipment in the wakeup state; and save switching RRC reconfiguration information of remote user equipment in the sleep state, wherein the electronic equipment is the relay user equipment, the remote user equipment communicates with satellite equipment via the relay user equipment, and the sleep parameters include a duration of a sleep state and a duration of a wakeup state.

7. The electronic equipment according to claim 6, wherein the processing circuitry is further configured to:

send, after remote user equipment in the sleep state wakes up, the switching RRC reconfiguration information to the remote user equipment.

8. The electronic equipment according to claim 6, wherein the processing circuitry is further configured to:

receive RRC connection resume request information from the remote user equipment, wherein the RRC connection resume request information includes a source serving base station of the remote user equipment;

send the RRC connection resume request information to a serving base station of the electronic equipment, so that the serving base station of the electronic equipment requests a context of the remote user equipment from the source serving base station of the remote user equipment;

receive RRC connection resume information of the remote user equipment from the serving base station of the electronic equipment; and send the RRC connection resume information to the remote user equipment.

9. The electronic equipment according to claim 6, wherein the processing circuitry is further configured to:

send measurement instruction information to remote user equipment which is in a wakeup state, has a hybrid connection, and served by the electronic equipment, to instruct the remote user equipment to perform a switching measurement;

perform a switching measurement; and send a measurement result to the serving base station, wherein the measurement result comprises a measurement result from the electronic equipment and a measurement result from the remote user equipment, wherein the remote user equipment having a hybrid connection performs one of uplink communication and downlink communication with the satellite equipment through the electronic equipment, and performs the other one of the uplink communication and the downlink communication with the satellite equipment directly.

10. The electronic equipment according to claim 9, wherein the processing circuitry is further configured to:

send measurement instruction information to the remote user equipment which is in a sleep state, has a hybrid connection, and served by the electronic equipment, to instruct the remote user equipment to measure a channel quality between the remote user equipment and the satellite equipment, when the remote user equipment wakes up.

11. Electronic equipment, comprising:

a memory;

a radio interface; and processing circuitry configured to:

receive sleep parameters and a start time of a next wakeup state of the electronic equipment, wherein the sleep parameters include a duration of a sleep state and a duration of a wakeup state, the sleep parameters are determined according to sleep parameters of relay user equipment, and the relay user equipment is in a wakeup state when the electronic equipment is in a wakeup state;

enter the sleep state and the wakeup state periodically according to the sleep parameters and the start time of the next wakeup state;

reconnect to the relay user equipment when the electronic equipment wakes up;

receive switching RRC reconfiguration information from the relay user equipment; and send switching RRC reconfiguration completion information to the relay user equipment, to communicate with a new serving base station through the relay user equipment, wherein the electronic equipment communicates with satellite equipment via the relay user equipment.

12. The electronic equipment of claim 11, wherein the processing circuitry is further configured to:

send expected sleep parameters of the electronic equipment, wherein the sleep parameters of the electronic equipment are determined further according to the expected sleep parameters of the electronic equipment.

13. The electronic equipment according to claim 11, wherein the processing circuitry is further configured to:

send RRC connection resume request information to the relay user equipment, wherein the RRC connection resume request information includes a source serving base station of the electronic equipment; and receive RRC connection resume information from the relay user equipment, to communicate with a new serving base station through the relay user equipment.

* * * * *